(12) United States Patent
Cooney et al.

(10) Patent No.: US 8,680,026 B2
(45) Date of Patent: *Mar. 25, 2014

(54) FLOW CELL DEVICE

(75) Inventors: Christopher G. Cooney, Severn, MD (US); David E. Sipes, Frederick, MD (US); Rebecca C. Holmberg, Rockville, MD (US); Phillip Belgrader, Severna Park, MD (US)

(73) Assignee: Akonni Biosystems, Inc., Frederick, MD (US)

( * ) Notice: Subject to any disclaimer, the term of this patent is extended or adjusted under 35 U.S.C. 154(b) by 576 days.

This patent is subject to a terminal disclaimer.

(21) Appl. No.: 12/840,826

(22) Filed: Jul. 21, 2010

(65) Prior Publication Data

US 2010/0284859 A1  Nov. 11, 2010

Related U.S. Application Data

(63) Continuation-in-part of application No. 12/149,865, filed on May 9, 2008.

(60) Provisional application No. 61/213,887, filed on Jul. 24, 2009.

(51) Int. Cl.
*C40B 60/12* (2006.01)

(52) U.S. Cl.
USPC .......................................................... 506/39

(58) Field of Classification Search
None
See application file for complete search history.

(56) References Cited

U.S. PATENT DOCUMENTS

| | | | |
|---|---|---|---|
| 6,648,860 B2 * | 11/2003 | Staats et al. | 604/265 |
| 2002/0192701 A1 * | 12/2002 | Adey | 435/6 |
| 2004/0037739 A1 | 2/2004 | McNeely et al. | |
| 2004/0241660 A1 * | 12/2004 | Wojtowicz et al. | 435/6 |
| 2006/0088863 A1 * | 4/2006 | Yamamoto et al. | 435/6 |
| 2006/0141610 A1 * | 6/2006 | Xing et al. | 435/287.2 |

FOREIGN PATENT DOCUMENTS

| | | |
|---|---|---|
| EP | 1374988 A2 | 2/2004 |
| EP | 1374996 A1 | 2/2004 |
| JP | 2001521622 A | 11/2001 |
| JP | 2002311008 A | 10/2002 |
| JP | 2005334682 A | 12/2005 |
| JP | 2007171144 A | 7/2007 |
| JP | 2008528170 A | 7/2008 |
| WO | 9845481 | 10/1998 |
| WO | 03/015922 A1 | 2/2003 |
| WO | 2006080024 A2 | 8/2006 |

OTHER PUBLICATIONS

Supplementary European Search Report issued in EP 08754280, dated Sep. 16, 2011.

(Continued)

*Primary Examiner* — Christian Boesen
(74) *Attorney, Agent, or Firm* — Andrews Kurth LLP; Michael Ye

(57) ABSTRACT

A microarray system is disclosed. The microarray system includes a microarray formed on a planar substrate and an incubation chamber formed around the microarray. The incubation chamber has a plurality of interior surfaces including a bottom surface on which the microarray is formed and a top surface that faces the bottom surface and is generally parallel to the bottom surface. At least one of a plurality of interior surfaces is a hydrophilic surface.

3 Claims, 26 Drawing Sheets

(56) References Cited

OTHER PUBLICATIONS

Ingrid A. Beck, et al.; Simple, Sensitive, and Specific Detection of Human Immunodeficiency Virus Type 1 . . . ; Journal of Clinical Mircrobiology; Jan. 2001; pp. 29-33.

Quanguo He, et al.; Preparation of Hydrophilic Poly (dimethylsiloxane) Stamps by Plasma-Induced Grafting; Langmui; Jul. 2003; pp. 6982-6986; vol. 19.

Georgios Keramas, et al.; Development of a Multiplex Microarray Microsystem; Lab on a Chip; Jan. 2004; pp. 152-158; vol. 4.

Robin Hui Liu, et al.; Fully Integrated Miniature Device for Automated Gene Expression DNA Microarray Processing; Anal. Chem.; Mar. 2006; pp. 1980-1986; vol. 78.

Jose M. Moran-Mirabal, et al.; Controlling Microarray Spot Morphology with Polymer Liftoff Arrays; Anal. Chem.; Feb. 2007; pp. 1109-1114; vol. 79, No. 3.

* cited by examiner

| 15 | 14 | 13 | 12 | 11 | 10 | 9 | 8 | 7 | 6 | 5 | 4 | 3 | 2 | 1 | |
|---|---|---|---|---|---|---|---|---|---|---|---|---|---|---|---|
|  |  |  |  |  |  |  |  |  |  |  |  |  |  |  | 1 |
| Cy3 |  |  |  |  |  |  |  |  |  |  |  |  | Cy3 |  | 2 |
|  |  |  |  |  |  |  |  |  |  |  |  |  |  |  | 3 |
|  |  |  |  |  |  |  |  |  |  |  |  |  |  |  | 4 |
|  |  |  |  |  | H | H | H | H |  |  |  |  |  |  | 5 |
|  |  |  |  |  |  |  |  |  |  |  |  |  |  |  | 6 |
|  |  |  |  |  | 226 | E | 323 | E |  |  |  |  |  |  | 7 |
|  |  |  |  |  | 226 | E | 323 | E |  |  |  |  |  |  | 8 |
|  |  |  |  |  | 226 | E | 323 | E |  |  |  |  |  |  | 9 |
|  |  |  |  |  | 226 | E | 323 | E |  |  |  |  |  |  | 10 |
|  |  |  |  |  |  |  |  |  |  |  |  |  |  |  | 11 |
|  |  |  |  |  | 166 | 166 | 166 | 166 |  |  |  |  |  |  | 12 |
|  |  |  |  |  |  |  |  |  |  |  |  |  |  |  | 13 |
|  |  |  |  |  |  |  |  |  |  |  |  |  |  |  | 14 |
|  |  |  |  |  |  |  |  |  |  |  |  |  | Cy3 |  | 15 |

Cy3: Beacon
166: Nonsense probe (dN20)
H: Hybridization control
E: Empty gel element
226: Streptococcus specific probe 1
323: Streptococcus specific probe 2

FIG. 18C

Note: Solution #4 not present on chip

| Cy3 |    |     |      | Cy3 | Cy3 |    |     |      | Cy3 |
|-----|----|-----|------|-----|-----|----|-----|------|-----|
|     | 9  | 31  | 42   | H   |     | 9  | 31  | 42   | H   |
|     | 14 | 35  | 43   |     |     | 14 | 35  | 43   |     |
|     | 18 | 36  |      | 29  |     | 18 | 36  |      | 29  |
|     | 19 | 37  | dN20 | 90  |     | 19 | 37  | dN20 | 90  |
| Cy3 |    |     |      | Cy3 |     |    |     |      |     |
| Cy3 |    |     |      | Cy3 | Cy3 |    |     |      | Cy3 |
|     | 9  | 31  | 42   | H   |     | 9  | 31  | 42   | H   |
|     | 14 | 35  | 43   |     |     | 14 | 35  | 43   |     |
|     | 18 | 36  |      | 29  |     | 18 | 36  |      | 29  |
|     | 19 | 37  | dN20 | 90  |     | 19 | 37  | dN20 | 90  |
| Cy3 |    |     |      | Cy3 |     |    |     |      |     |

FIG. 21A

| Sample ID | Description |
|-----------|-------------|
| 9         | *mecA*      |
| 29        | *mecA*      |
| 14        | *tufA* (Staph genus) |
| 42        | *tufA* (Staph genus) |
| 18        | *tufA* (S. aureus) |
| 19        | *tufA* (S. aureus) |
| 31        | *tufA* (S. aureus) |
| 43        | *tufA* (S. aureus) |
| 35        | mecA Cassette Jctn |
| 36        | mecA Cassette Jctn |
| 37        | mecA Cassette Jctn |
| 90        | M13 internal positive control |
| Cy3       | Cy3 control beacon |
| dN20      | Nonsense probe |

FIG. 21B

FLOW CELL DEVICE

RELATED APPLICATIONS

This application is a continuation-in-part of U.S. patent application Ser. No. 12/149,865, filed on May 9, 2008, and claims the priority of U.S. provisional Application No. 61/213,887, filed on Jul. 24, 2009, both of which are incorporated herein by reference in their entirety.

TECHNICAL FIELD

The technical field is detection of biomolecules and, in particular, a flow cell device having a reaction chamber containing a target capturing surface, a waste chamber, and a channel of variable width connecting the reaction chamber and the waste chamber.

BACKGROUND

Microarrays offer great potential for performing complex analyses of samples by carrying out multiple detection reactions simultaneously. Typically, a microarray of multiple spots of reactant molecules is formed on a planar substrate such as a glass microscope slide, usually in a two-dimensional grid pattern. Liquid sample and reagents are then applied to the slide to contact multiple spots simultaneously. Various reaction steps may be performed with the bound molecules in the microarray, including exposure of bound reactant molecules to the liquid sample and reagents and washing steps. The progress or outcome of the reaction may be monitored at each spot in the microarray in order to characterize either material(s) immobilized on the slide or material(s) in a liquid sample.

Microarray analysis usually requires an incubation period that ranges from minutes to hours. The duration of the incubation period is assay dependent and is determined by a variety of factors, such as the type of reactant, degree of mixing, sample volume, target copy number, and density of the array. During the incubation period, target molecules in the liquid sample must be in intimate contact with the microarray probes. The incubation is usually performed in an incubation chamber. The incubation chamber is typically formed by forming a gasket around the microarray. The gasket is covered with a cover slip to form an enclosed chamber. The cover slip can be made of a transparent material, such as glass, to allow optical interrogation of the microarray after the incubation.

If the cover slip does not have an entry port and a vent, the liquid sample and other reagents need to be added to the incubation chamber before the cover slip is placed on top of the gasket. If the reaction mixture is filled to the rim of the gasket, the reaction mixture may leak out of the side of the gasket, compromising the gasket/cover seal and increasing the risk of contaminating the environment. Cover slips with holes for filling and venting circumvent these two problems. However, filling the incubation chamber through holes on the cover slip often risks the introduction of air bubbles or air pockets into the incubation chamber. Moreover, surface tension of a liquid sample or a reaction mixture may also prevent the liquid sample or reaction mixture from completely filling the incubation chamber. A partially filled chamber may result in a false negative if an air pocket covers an array spot and prevents contact between the array spot and the liquid sample or reaction mixture.

SUMMARY

A flow cell device for detecting a target molecule is disclosed. The flow cell device includes a reaction chamber, a waste chamber, an inlet port, a first channel that connects the reaction chamber to the inlet port, and a second channel that connects the reaction chamber to the waste chamber. The reaction chamber has an inlet, an outlet, a microarray and a hydrophilic region on at least one of the top and bottom sides of the chamber. The waste chamber has an absorbent to allow liquids to be advanced by capillary action through the reaction chamber for washing.

Also disclosed is a device for detecting a target molecule. The device comprises a reaction chamber having an inlet, an outlet, a target capturing surface that binds specifically to the target molecule and a hydrophilic region on at least one of the top and bottom sides of the reaction chamber; a waste chamber having an absorbent to allow liquids to be advanced by capillary action through the reaction chamber for washing; and a channel of variable width connecting the reaction chamber to the waste chamber.

DESCRIPTION OF THE DRAWINGS

The detailed description will refer to the following drawings, wherein like numerals refer to like elements, and wherein:

FIG. 18C is the array map of the microarray system of FIG. 18A.

FIG. 21A is a MRSA chip map of a microarray, contained in the reaction chamber of a microarray system and used to obtain the data for FIGS. 20, 22 and 23. The chip map has replicates of 4 to increase confidence of the test and evaluate non-uniformities across quadrants.

FIG. 21B shows a list of probes associated with chip map. Probes for the same target differ by length or sequence. Probe sequences 9 and 29 are from the mecA gene that confers methicillin resistance. Probes 14 and 42 are from the tufA gene, present among all strains of Staph. Probes 18, 19, 31, and 43 are from the tufA gene, but unique to *S. aureus* only. Probes 35, 36, and 37 target the junction region between *S. aureus* and the mecA cassette.

DETAILED DESCRIPTION

Figure 1:
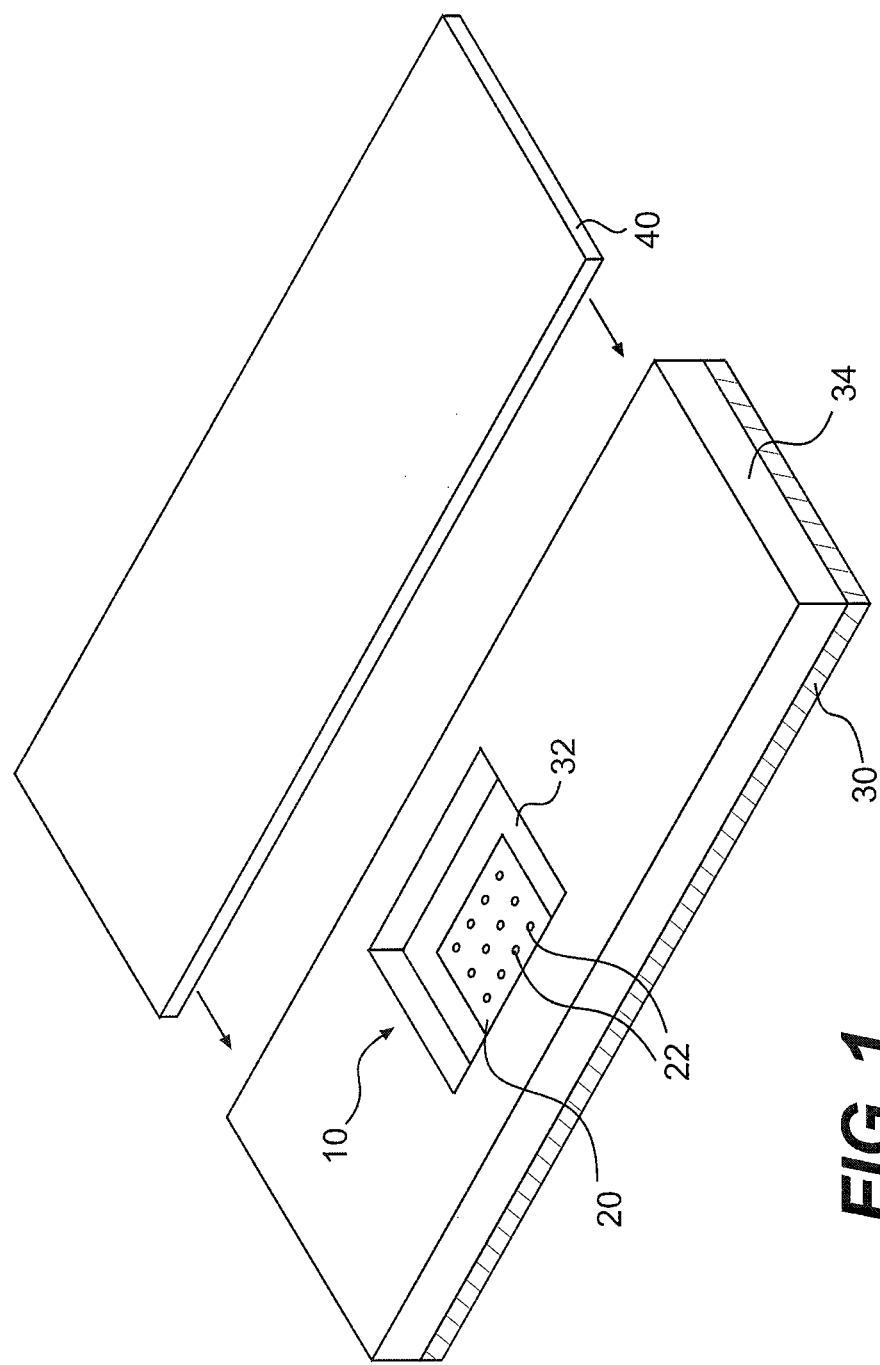
FIG. 1 is a schematic of an embodiment of an incubation chamber of a microarray system.

This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "front," "back" "up," "down," "top" and "bottom," as well as derivatives thereof, should be construed to refer to the orientation as then described or as shown in the drawing figure under discussion. These relative terms are for convenience of description and normally are not intended to require a particular orientation. Terms concerning attachments, coupling and the like, such as "connected" and "attached," refer to a relationship wherein structures are secured or attached to one another either directly or indirectly through intervening structures, as well as both movable or rigid attachments or relationships, unless expressly described otherwise.

The term "target capturing surface," as used herein, refers to a surface that binds specifically to a target molecule. The target capturing surface may be a surface coated with a target capturing material, such as an oligonucleotide probe, an antigen, or an antibody. The target capturing surface may also be an uncoated surface that exhibit a specific affinity to a target molecule, such as a sintered glass frit surface that binds specifically to nucleotides. In certain embodiments, the target capturing surface contains a microarray.

The term "microarray," as used herein, refers to an ordered array of spots presented for binding to ligands of interest. A microarray consists of at least two spots. The ligands of interest include, but are not limited to, nucleic acids (e.g., molecular beacons, aptamers, locked nucleic acids, peptide nucleic acids), proteins, peptides, polysaccharides, antibodies, antigens, viruses, and bacteria.

The term "hydrophilic surface" as used herein, refers to a surface that would form a contact angle of 60° or smaller with a drop of pure water resting on such a surface. The term "hydrophobic surface" as used herein, refers to a surface that would form a contact angle greater than 60° with a drop of pure water resting on such a surface. Contact angles can be measured using a contact angle goniometer.

The term "incubation chamber," as used herein, refers to an enclosed space around a target capturing surface or a microarray. The incubation chamber, when filled with a liquid sample, allows the target capturing surface or microarray to be submerged in the liquid sample so that target molecules in the liquid sample can maintain intimate contact with the target capturing surface or microarray probes.

On-chip amplification is defined here as the process in which the amplification, either symmetric or asymmetric, of a target molecule occurs in solution in an incubation chamber containing a microarray.

Other amplification schemes are possible in the microarray system format, for example where one or more primers at the same or different concentration ratios are immobilized on the microarray and amplification occurs either entirely or partially on the array. Additional primers may be added to the chamber in solution that are the same or different sequences as the primers immobilized on the array. These amplification schemes can occur either isothermally or using temperature cycling using either DNA or RNA enzymes. Examples include: Arrayed primer extension (APEX), multiplex microarray-enhanced PCR (MME-PCR), bridge amplification, single nucleotide incorporation, rolling circle amplification (RCA), strand displacement amplification (SDA), Loop mediated amplification (LAMP), Transcription Mediated Amplification (TMA), Helicase dependent amplification (HDA), Nicking enzyme amplification reaction (NEAR), Nucleic Acid Sequence Based Amplification (NASBA), Amplification Refractory Mutation System (ARMS), and the Invader technology.

Other nucleic acid reactions that can be employed in the microarray system include ligation, restriction enzyme digest with exo- or endonucleases, nicking enzyme cleavage, hybridization protection assay (HPA), or translation.

As noted above, surface tension of a liquid sample or a reaction mixture often prevent the liquid sample or reaction mixture from completely filling a small space, such as the incubation chamber of a microarray system. Surface tension is the result of the attraction between the molecules of the liquid by various intermolecular forces. In the bulk of the liquid, each molecule is pulled equally in all directions by neighboring liquid molecules, resulting in a net force of zero. At the surface of the liquid, the molecules are pulled inwards by other molecules deeper inside the liquid and are not attracted as intensely by the molecules in the neighboring medium (be it vacuum, air or another fluid). Therefore all of the molecules at the surface are subject to an inward force of molecular attraction which can be balanced only by the resistance of the liquid to compression. This inward pull tends to diminish the surface area, and in this respect a liquid surface resembles a stretched elastic membrane. Accordingly, the liquid squeezes itself together until it has the locally lowest surface area possible. The net result is that the liquid may maintain a near-spherical shape inside the small space and does not fill the corners, especially square corners of the small space. The typical small gap that separates the cover from the microarray surface often compresses the liquid into a cylindrical shape.

In the case of flow cell devices, the liquid that fills the incubation chamber is most likely a water-based liquid, such as a hybridization buffer or washing buffer. The surface tension of the water-based liquid may be overcome by coating at least a portion of the interior surface of the incubation chamber with a hydrophilic material.

Described herein is a flow cell system having an incubation chamber that contains a target capturing surface and a hydrophilic surface that contacts the liquid as it enters the chamber. The use of a hydrophilic surface that contacts the liquid as it enters the chamber allows complete filling of the incubation chamber. In certain embodiments, the hydrophilic surface forms the complete top surface of the incubation chamber. In other embodiments, the target capturing surface contains a microarray.

FIG. 1 shows an embodiment of an incubation chamber. In this embodiment, the incubation chamber 10 is formed around a microarray 20, which consists of a plurality of array spots 22 printed or formed on the top surface 32 of a planar substrate 30. The surface 32 also forms the bottom surface of the incubation chamber 10. The top of the chamber 10 is covered with a cover slip 40. The incubation chamber 10 can be of any size or shape that matches the dimension of the planar substrate 30, which is typically a glass or plastic slide. In certain embodiments, the planar substrate 30 is a plastic film that can be rolled for reel-to-reel manufacturing. In one embodiment, the plastic film is a polyester.

In this embodiment, the incubation chamber 10 is formed by placing a gasket 34 on top of the planar substrate 30 and covering the gasket 34 with the cover slip 40. In another embodiment, the incubation chamber 10 is formed by creating a pocket or recession area in the planar substrate 30 (by molding or etching, for example), printing the microarray 20 at the bottom of the pocket or recession area, and covering the pocket or recession area with the cover slip 40. In yet another embodiment, the pocket or recession area is formed on the cover slip 40, which is then placed directly on top of the planar substrate 30.

The incubation chamber 10 is formed around the microarray 20 so as to reduce the liquid volume needed for hybridization or any other reactions in the incubation chamber 10. In one embodiment, the incubation chamber has a foot print of about 0.1-10 $cm^2$, preferably about 0.25-2.5 $cm^2$, and a height of about 0.05-5 mm, preferably about 0.1-1 mm. In one embodiment, the total volume of the incubation chamber is in the range of 1-250 μl.

Depending on its shape, the incubation chamber 10 may have several interior surfaces, including a bottom surface on which the microarray 20 is formed, a top surface that faces downward to the bottom surface and is generally parallel to the bottom surface, and one or more side surfaces. For the purpose of ensuring uniform filling of the incubation chamber 10, not all interior surfaces need to be hydrophilic. In one embodiment, only the top surface of the incubation chamber 10 is hydrophilic. In another embodiment, only the bottom surface of the incubation chamber 10 is hydrophilic. In another embodiment, both the top and bottom surfaces are hydrophilic. In yet another embodiment, all interior surfaces of the incubation chamber are hydrophilic.

A hydrophilic surface is a surface that attracts water. Hydrophilic surfaces typically contain molecules that are charge-polarized and capable of hydrogen bonding. In one embodiment, the planar substrate 30 or the cover slip 40 is made of a hydrophilic material and hence provide a hydrophilic bottom surface or hydrophilic top surface, respectively. In another embodiment, the top surface or the bottom surface of the incubation chamber 10 is coated with an insoluble hydrophilic material. Examples of the hydrophilic material include, but are not limited to, hydrophilic polymers such as polyethylene glycols, polyhydroxyethyl methacrylates, Bionite, poly(N-vinyl lactams), poly(vinylpyrrolidone), poly (ethylene oxide), poly(propylene oxide), polyacrylamides, cellulosics, methyl cellulose, polyanhydrides, polyacrylic acids, polyvinyl alcohols, polyvinyl ethers, alkylphenol ethoxylates, complex polyol mono-esters, polyoxyethylene esters of oleic acid, polyoxyethylene sorbitan esters of oleic acid, and sorbitan esters of fatty acids; inorganic hydrophilic materials such as inorganic oxide, gold, zeolite, and diamond-like carbon; and surfactants such as Triton X-100, Tween, Sodium dodecyl sulfate (SDS), ammonium lauryl sulfate, alkyl sulfate salts, sodium lauryl ether sulfate (SLES), alkyl benzene sulfonate, soaps, fatty acid salts, cetyl trimethylammonium bromide (CTAB) a.k.a. hexadecyl trimethyl ammonium bromide, alkyltrimethylammonium salts, cetylpyridinium chloride (CPC), polyethoxylated tallow amine (POEA), benzalkonium chloride (BAC), benzethonium chloride (BZT), dodecyl betaine, dodecyl dimethylamine oxide, cocamidopropyl betaine, coco ampho glycinate alkyl poly (ethylene oxide), copolymers of poly(ethylene oxide) and poly(propylene oxide) (commercially called Poloxamers or Poloxamines), alkyl polyglucosides, fatty alcohols, cocamide MEA, cocamide DEA, cocamide TEA. Surfactants can be mixed with reaction polymers such as polyurethanes and epoxies to serve as a hydrophilic coating. In another embodiment, the top surface or the bottom surface of the incubation chamber 10 is made hydrophilic by atmospheric plasma treatment.

Alternatively, the bottom surface or top surface of the incubation chamber may be covered with a commercially available hydrophilic tape or film. Examples of hydrophilic tape include, but are not limited to, Adhesives Research (AR) tape 90128, AR tape 90469, AR tape 90368, AR tape 90119, AR tape 92276, and AR tape 90741 (Adhesives Research, Inc., Glen Rock, Pa.). Examples of hydrophilic film include, but are not limited to, Vistex® and Visguard® films from (Film Specialties Inc., Hillsborough, N.J.), and Lexan HPFAF (GE Plastics, Pittsfield, Mass.). Other hydrophilic surfaces are available from Surmodics, Inc. (Eden Prairie, Minn.), Biocoat Inc. (Horsham, Pa.), Advanced Surface Technology (Billerica, Mass.), and Hydromer, Inc. (Branchburg, N.J.).

In one embodiment, the hydrophilic tape or film has sufficient transparency to allow optical interrogation of the microarray from the top of the incubation chamber. In another embodiment, the hydrophilic surface is created by coating the top surface of the incubation chamber with a hydrophilic coating. In another embodiment, the hydrophilic surface is created by simply replacing the cover slip 40 with a hydrophilic tape or hydrophilic film.

In yet another embodiment, the hydrophilic surface is a hydrophilic matrix with impregnated chemicals that lyse cell membranes, denatures proteins, and trap nucleic acids. The hydrophilic matrix would perform two functions, purification of the sample and uniformly wicking of the sample into the incubation chamber. In one embodiment, the hydrophilic matrix is FTA Paper® (Whatman, Florham Park, N.J.). Biological samples are applied to the FTA® paper and cells contained in the sample are lysed on the paper. The paper is washed to remove any non-DNA material (the DNA remains entangled within the paper). The DNA is then eluted for subsequent microarray analysis. Alternatively, the bound DNA may be amplified in situ for microarray detection without an elution step.

The FTA Paper® can be used as an opposing surface to the array (i.e., the top surface of the incubation chamber). Alternatively, the microarray may be printed on the FTA Paper® and a transparent cover slide on top of the incubation chamber would allow visualization of the microarray. In another embodiment, PCR reagents may be introduced into the incubation chamber for amplification of a nucleic acid sample on the FTA Paper®. In this embodiment, the amplification will be performed inside the incubation chamber 10.

The microarray 20 can be any type of microarray, including but not limited to oligonucleotide microarrays and protein microarrays. In one embodiment, the microarray 20 is formed using the printing gel spots method described in e.g., U.S. Pat. Nos. 5,741,700, 5,770,721, 5,981,734, 6,656,725 and U.S. patent application Ser. Nos. 10/068,474, 11/425,667 and 60/793,176, all of which are hereby incorporated by reference in their entirety.

Figure 2:
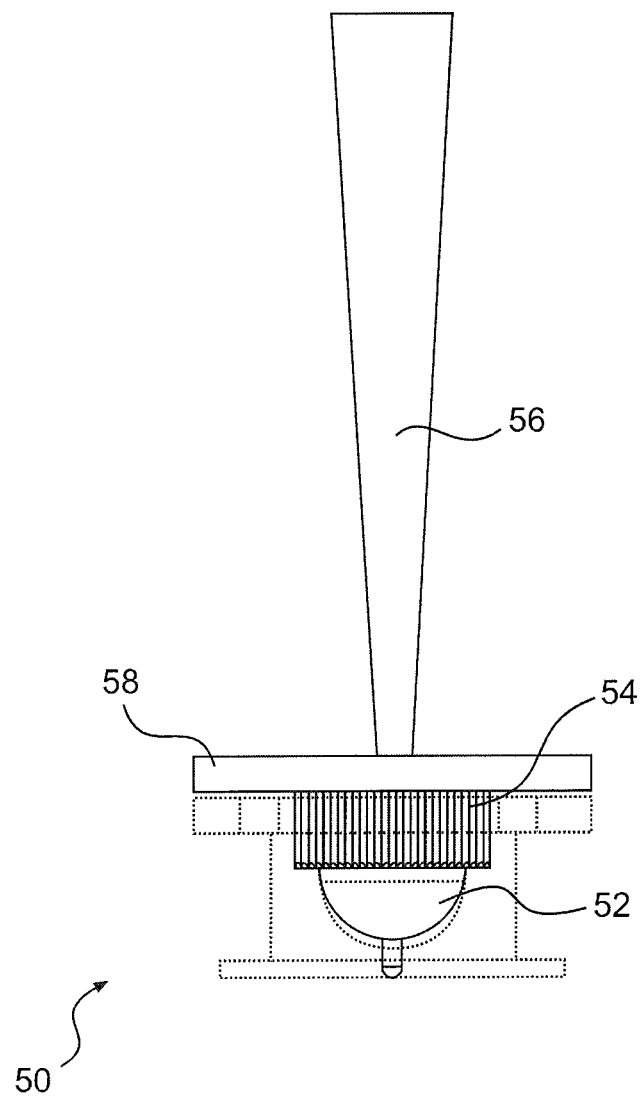
FIG. 2 is a schematic of a dome valve in a support housing with a penetrating pipette tip.

In another embodiment, the microarray system further contains a one-way valve for introducing a liquid (e.g., a sample, a PCR buffer with target, a hybridization buffer, or a washing buffer) into the incubation chamber 10. The sample is introduced into the incubation chamber 10 through the one-way valve to prevent environmental contamination, which is an important concern in certain applications such as the detection of biological warfare agents. The one-way valve can be a check valve or a dome valve that is placed at an inlet port of the incubation chamber 10. Dome valves of various sizes are commercially available (e.g., from Minivalve International, Yellow Springs, Ohio). In an embodiment shown in FIG. 2, the dome valve 50 contains two components: a dome-shaped valve body 52 and a back seal 54. The back seal has a hole (not shown) that allows an introducer 56 to penetrate the back seal 54. The introducer 56 may be any liquid delivering device having a pointed tip to penetrate the back seal 54. In this embodiment, the introducer 56 is a pipette tip. In another embodiment, the introducer 56 is a syringe needle.

Figure 3:
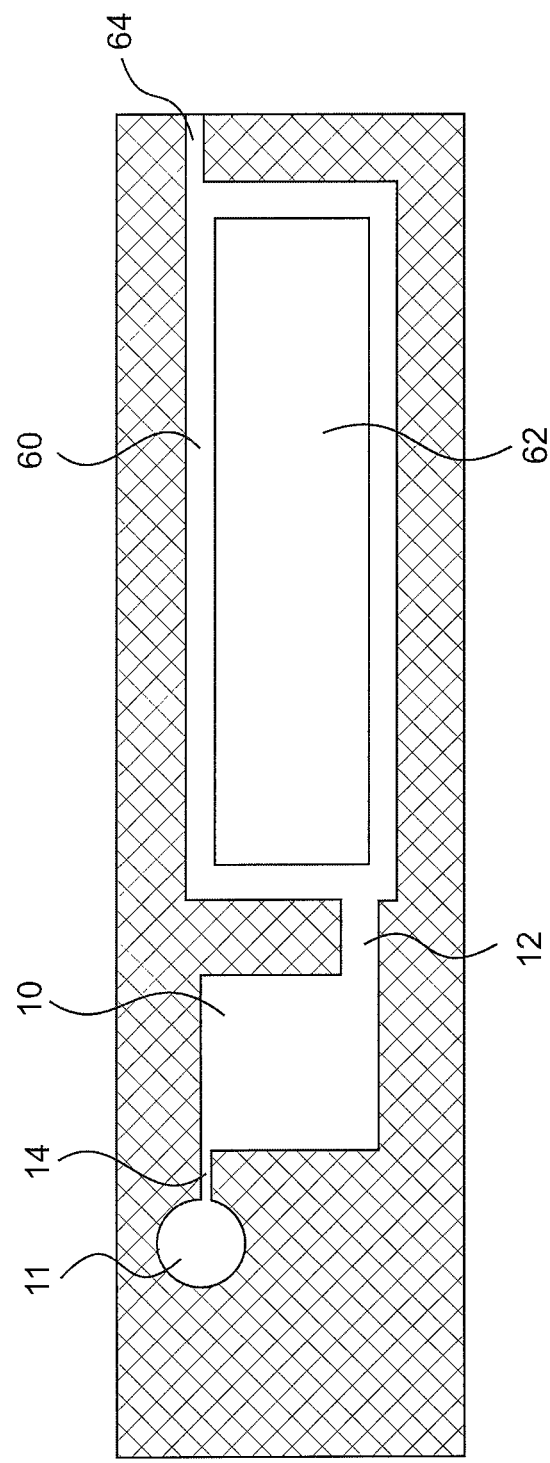
FIG. 3 is a schematic of an embodiment of a microarray system with a waste chamber.

The dome valve 50 allows easy access with the introducer 56 and conforms to the tip of the introducer 56 as the tip enters the dome valve 50 through the back seal 54. After the introducer 56 is withdrawn, the opening on the back seal 54 is spontaneously closed to prevent the sample from leaking out of the incubation chamber 10 from the dome valve 50. Therefore, the dome valve 50 acts as both a pierceable septum and a check valve. The dome valve may be installed on a microarray assembly through the supporting structure 58. In one embodiment, the dome valve is connected to the incubation chamber 10 through an inlet port 11 and inlet channel 14 (FIG. 3).

In yet another embodiment, the microarray system further includes a waste chamber. Many optical readers, such as the Aurora Photonics Port Array 5000™ microarray reader, give improved signal-to-noise ratios when reading dry images. Therefore, it is advantageous to incorporate a waste chamber into the microarray system to remove liquid from the incubation chamber before placing the microarray in a microarray reader. Referring now to FIG. 3, the incubation chamber 10 is connected to a waste chamber 60 formed on the same microarray slide.

The waste chamber 60 can be of any shape and typically has a volume that is greater than the volume of the incubation chamber 10. In one embodiment, the waste chamber is formed in a gasket tape which is then attached to the substrate 30 (See FIG. 1) on which the microarray 20 is printed. In yet another embodiment, the substrate 30 has a cut-out on its top surface. The cut-out has a size and position that match the size and position of the waste chamber 60 in the gasket 34 so that the waste chamber 60, once formed between the substrate 30 and the gasket 34, would have a depth that is greater than the depth of the incubation chamber 10. In another embodiment, the substrate 30 is made of a plastic material so that a cut-out may be easily made on the substrate 30. In yet another embodiment, both the incubation chamber 10 and the waste chamber 60 are formed in the substrate 30 without using the gasket 34. The waste chamber 60, however, may have a depth that is greater than the depth of the incubation chamber 10.

In one embodiment, the waste chamber 60 contains an absorbent 62 that, once in contact with the liquid in the incubation chamber 10, wicks the liquid from the incubation chamber 10, therefore allowing the microarray 20 to be read in a dry state.

The absorbent 62 can be any material capable of retention of a relative large quantity of liquid. In one embodiment, the absorbent 62 is made of an aggregate of fibers. In another embodiment, the absorbent 62 is a nonwoven fabric produced in a through-air bonding process. The constituent fibers of the nonwoven fabric can be hydrophilic synthetic fibers, natural cellulose fibers of pulp or the like, or regenerated cellulose fibers. The fibers may be coated or infiltrated with a surfactant or a hydrophilic oil to improve liquid absorbance. Not limited to the through-air bonding process, the nonwoven fabric for use herein may be produced in any other process such as a spun-bonding process, an air laying process, a spun-lacing process, etc. In one embodiment, the absorbent 62 is a cellulose paper (C048) from Millipore (Billerica, Mass.)

Referring again to FIG. 3, the waste chamber 60 is connected to the incubation chamber 10 through a channel 12.

The channel 12 serves dual purposes. When filled with the liquid, the channel 12 provides a liquid passage way between the incubation chamber 10 and the waste chamber 60. When filled with air, the channel 12 separates the incubation chamber 10 from the waste chamber 60 and prevents premature wicking by the absorbent 62 in the waste chamber 60.

The liquid inside the incubation chamber 10 is removed by forcing the liquid inside the incubation chamber 10 into the channel 12 and establishing a contact between the liquid in the channel 12 and the absorbent 62 in the waste chamber 60. The contact may be established by applying a pressure to the liquid in the incubation chamber 10 to push the liquid out of the channel 12 or by applying suction at a vent 64 of the waste chamber 60 to pull the liquid out of the channel 12. A pressure to the liquid in the incubation chamber 10 may be generated by applying a pressure through the dome valve 50 (e.g., using a pipette or a syringe). If the incubation chamber 10 is covered only with a hydrophilic tape or a hydrophilic film, a pressure to the liquid inside the incubation chamber 10 may be generated by simply pressing the hydrophilic tape or film that form the top surface of the incubation chamber 10. Alternatively, the contact between the liquid in the channel 12 and the absorbent 62 may be established by advancing the absorbent 62 towards the channel 12 until the absorbent 62 touches the liquid inside the channel 12.

Once a contact is established, the liquid in the incubation chamber 10 is wicked into the absorbents 62 in the waste chamber 60 through the channel 12. The flow rate of the liquid is determined by the size of the channel 12, the surface tension and viscosity of the liquid, and the wicking rate of the absorbent 62. In addition, the flow rate decreases as the absorbent becomes more saturated. The flow rate can also be controlled by the placement of the absorbent 62 in the waste chamber 60. An absorbent placed close to the outlet of the channel 12 result in higher flow rates than an absorbent placed further away. Therefore, cutting a corner off of the absorbent 62 results in a slower flow rate because of the increased distance between the outlet of the channel 12 and the absorbent 62.

Figure 4:
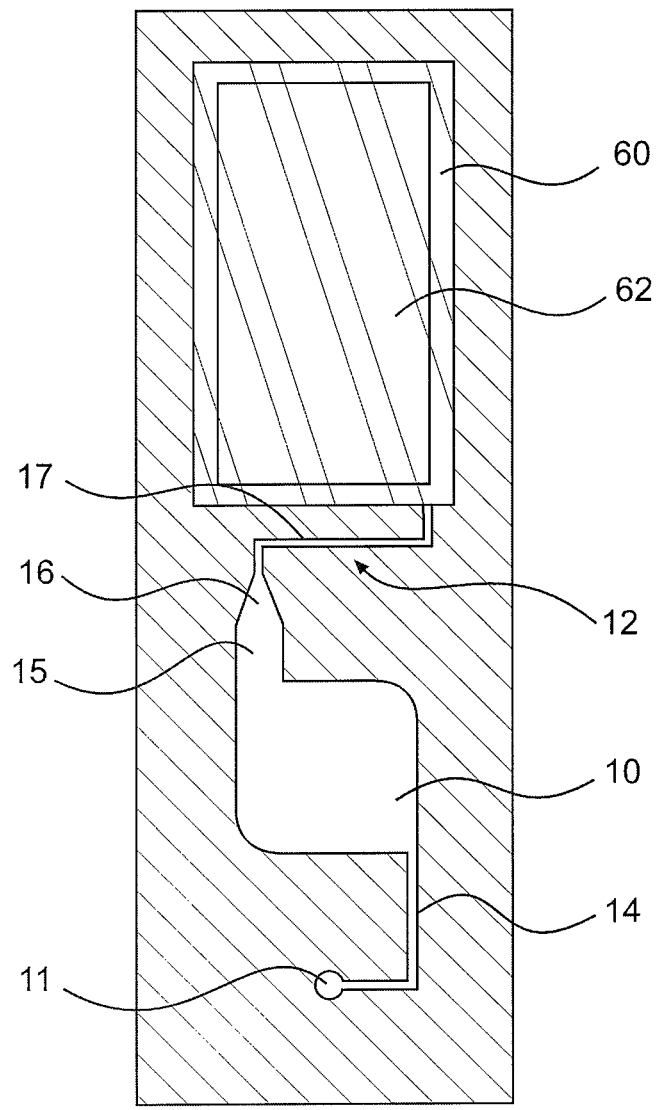
FIG. 4 is a schematic of another embodiment of a microarray system with a waste chamber.

In the event that an air bubble is introduced into the incubation chamber 10, the air bubble may be lodged in the channel 12 and partially or completely block liquid flow in the channel 12. The air bubble may also stop the wicking action of the absorbent 62 if the air bubble is located right at the interface of the liquid and the absorbent 62. This problem can be overcome with a channel design shown in FIG. 4. In this embodiment, the channel 12 includes three sections: an inlet section 15, a funnel shape connecting section 16 and an outlet section 17. The outlet section 17 has a diameter that is smaller than the diameter of the inlet section 15. The smaller diameter results in a higher capillary pressure in the outlet section 17 compared to the pressure in the inlet section 15. The pressure difference leads to liquid movement towards the outlet section 17. In operation, the liquid already in the outlet section 17 is pushed out of the outlet section 17 and passed around the air pocket at the interface of the liquid and the absorbent 62. The funnel shape connecting section 16 offers an overflow region that prevents premature wicking due to the capillary action of the channel. In another embodiment, the outlet section 17 is further divided into two subsections, a larger diameter first section (corresponding to the horizontal portion of section 17 in FIG. 4) and a smaller diameter second section (corresponding to the vertical portion of section 17 that enters the waste chamber 60).

If the hybridization or amplification process in the incubation chamber 10 involves a heating step, such as the denaturing step of thermal cycling in a polymerase chain reaction (PCR), the liquid inside the incubation chamber 10 may be pushed out of the channel 12 and make a premature contact with the absorbent 62 due to increased pressure in the incubation chamber 10. Under these circumstances, air may be intentionally left in the channel 12 (at the time when incubation chamber 10 is filled) to prevent premature wicking by the absorbent 62. Alternatively, a hydrophobic stop may be placed inside the channel 12 to prevent premature wicking by the absorbent 62. In one embodiment, the hydrophobic stop comprises a channel section with a hydrophobic interior surface. In one embodiment, the hydrophobic surface is formed by coating or treating the native channel surface with a hydrophobic material such as Teflon®, silicone or silane. In another embodiment, the interior surface of channel 12 is coated with a hydrophilic material and the hydrophobic stop comprises a section of channel 12 that has a non-coated surface exposing the native hydrophobic plastic material.

In another embodiment, the incubation chamber 10 is connected to multiple waste chambers 62 to ensure that wicking occurs at the appropriate interval.

Figure 5:
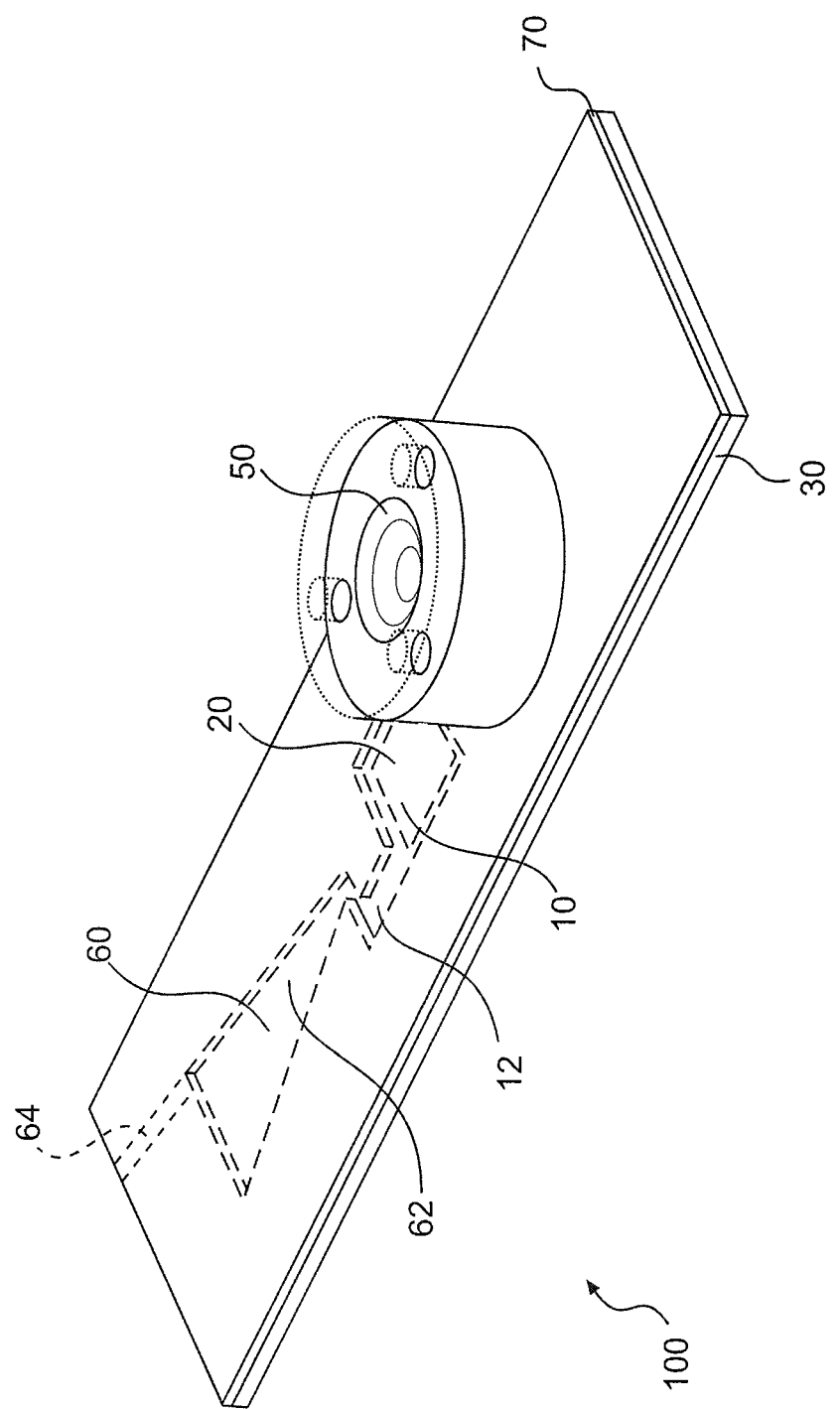
FIG. 5 is a schematic of an embodiment of an integrated microarray system.

Also described herein is an integrated microarray system having a hydrophilic incubation chamber for uniform filling, a one-way valve to prevent sample contamination, and a waste chamber for liquid removal from the incubation chamber. Referring now to FIG. 5, an embodiment of the integrated microarray system 100 includes a microarray 20 printed or formed on a substrate 30, a hydrophilic incubation chamber 10 formed around the microarray 20, a dome valve 50 in fluid communication with the incubation chamber 10 through a channel (not shown), and a waste chamber 60 connected to the incubation chamber 10 through a channel 12. An absorbent 62 is incorporated in the waste chamber 60, which is vented to the atmosphere through a vent 64. A transparent hydrophilic cover 70 forms the top surface of the incubation chamber 10 and the waste chamber 60. In one embodiment, the vent 64 is created by simply punching a hole in the cover of the waste chamber 60.

One advantage of covering the incubation chamber 10 and the waste chamber 60 with a hydrophilic tape or film is that the thin film or tape is capable of deforming under pressure. It is therefore possible to mix the liquid in the incubation chamber 10 by applying modest pressure to the waste chamber, which would cause slight deformation to the incubation chamber 10 and hence movement of liquid inside the incubation chamber 10.

Figure 6:
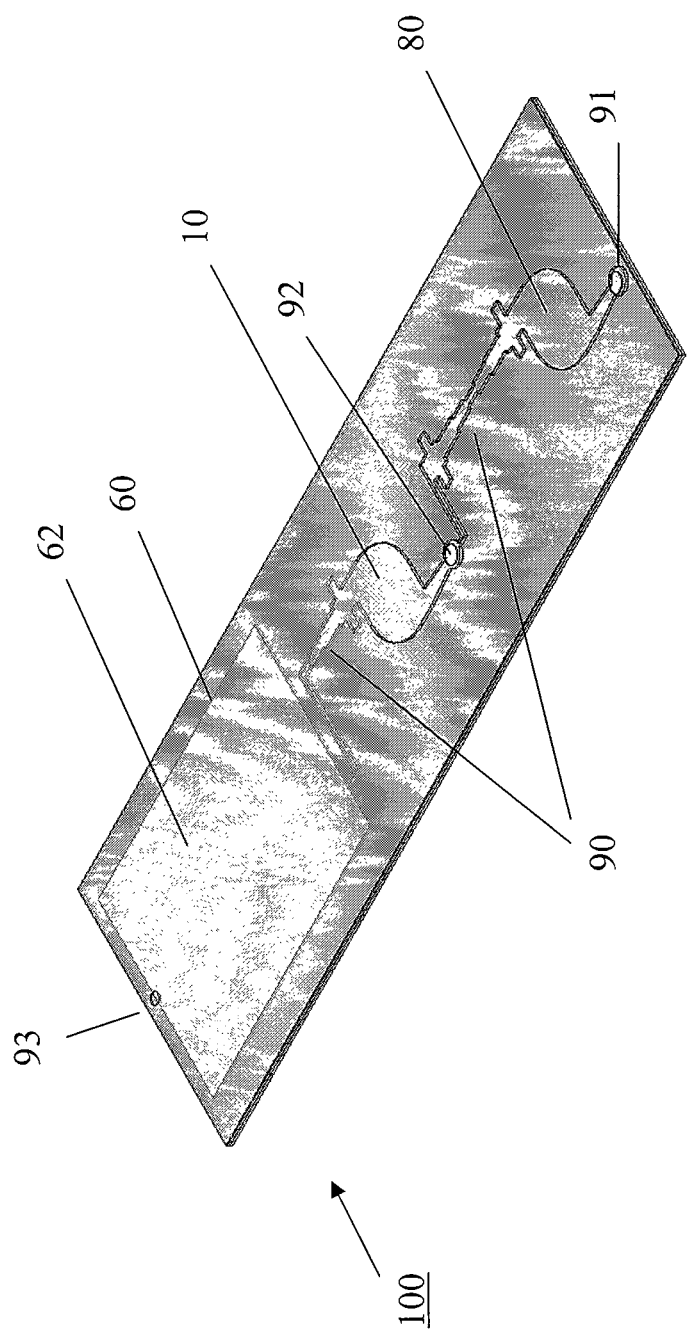
FIG. 6 is a schematic of another embodiment of an integrated microarray system.

FIG. 6 shows another embodiment of a microarray system 100 that contains reaction chamber 10, a waste chamber 60 and a wash buffer chamber 80. The chambers are connected to each other by capillary stops 90 that control the flow of liquids between the chambers. The capillary stops 90 may contain one or more "staircase" sections and/or one or more "switchback" sections to control the fluid flow. In this embodiment, a user first fills the wash buffer chamber 80 through inlet 91 and seals it. Next, the user fills the reaction chamber 10 with sample through inlet 92 and seals it. Finally the user seals the vent 93. The microarray system 100 is then placed in a conventional slide block thermocycler (e.g., Quanta Biotech, Thermofisher). After thermocycling, the microarray system 100 is removed and the vent 93 is pierced. After piercing the vent 93, the wash buffer advances through the reaction chamber and into the waste chamber, thus the reaction chamber ends in a dry state for imaging. The absorbent 62 in the waste chamber will contain the product and prevent aerosolization when piercing the vent 93. In one embodiment, a porous membrane may be used to ensure that there is no aerosilazation.

In another embodiment, a microarray system 200 for detecting a target molecule is disclosed. The microarray system 200 includes a reaction chamber, a waste chamber, an inlet port, a first channel that connects the reaction chamber to the inlet port, and a second channel that connects the reaction chamber to the waste chamber. The reaction chamber has an inlet, an outlet, a microarray and a hydrophilic region on at least one of the top and bottom sides of the chamber to allow a liquid sample to be introduced into the chamber without bubbles. The waste chamber has an absorbent to allow liquids to be advanced by capillary action through the reaction chamber for washing.

Figure 7:
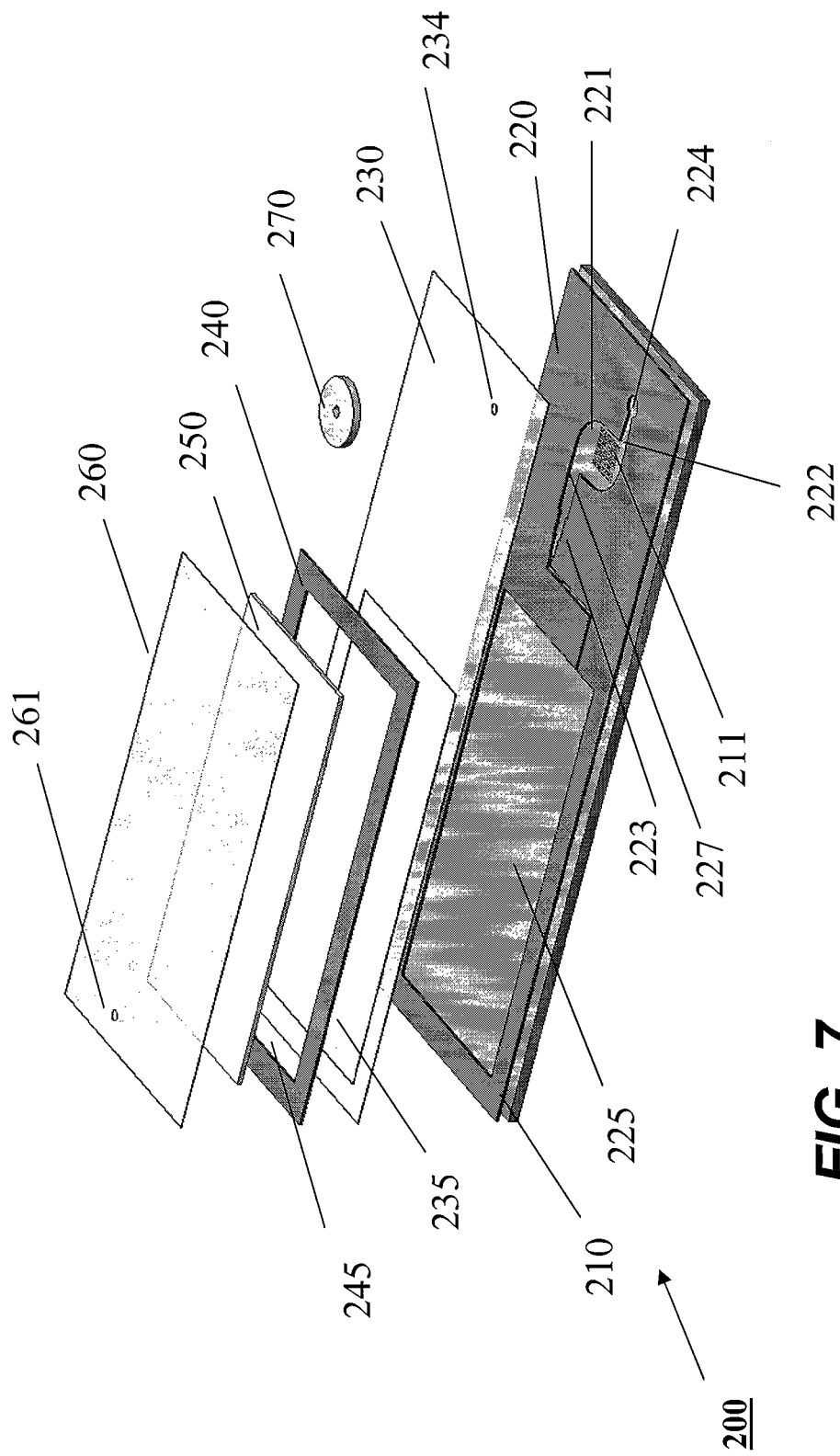
FIG. 7 is a schematic drawing showing the components of an integrated microarray assembly.

FIG. 7 shows an embodiment of the microarray system 200. In this embodiment, the microarray system 200 contains a layer structure that includes an array substrate 210 having a microarray 211, a reaction chamber spacer 220, a hydrophilic cover 230, and waste chamber spacer 240, an absorbent 250 and a waste chamber cover 260 with a vent hole 261. The reaction chamber spacer 220 has openings that form a reaction chamber 221 surrounding the array 211, connecting channels 222 and 223, an inlet hole 224 and a waste chamber 225 in an assembled microarray system. The channel 222 connects the reaction chamber 221 to the inlet hole 224, and the channel 223 connects the reaction chamber 221 to the waste chamber 225.

The hydrophilic cover 230 covers the top of the reaction chamber 221 and the connecting channels 222 and 223. The hydrophilic cover 230 also contains an inlet hole opening 234 and a waste chamber opening 235 that match the inlet hole 224 and the waste chamber 225. The waste chamber spacer 240 has a waste chamber opening 245 that matches the waste chamber opening 235 in the hydrophilic cover 230 and the waste chamber in the spacer 220. The absorbent 250 is sized to fit into waste chamber 220 and covered by the waste chamber cover 260. The inlet hole opening 224 and 234 provide access to the reaction chamber 221 through the inlet port 270.

In one embodiment, the side walls of the reaction chamber 221 are hydrophobic to trap bubbles during the reaction.

In another embodiment, the hydrophilic cover 230 is configured such that a hydrophilic region is created near an outlet 227 of the reaction chamber 221. In a related embodiment, the hydrophilic region is created with hydrophilic gel elements.

In another embodiment, the inlet port 270 contains a pierceable membrane/tape or a dome valve to allow washing to occur without causing the content inside the reaction chamber 221 to be liberated from the microarray system 200.

Figure 8:
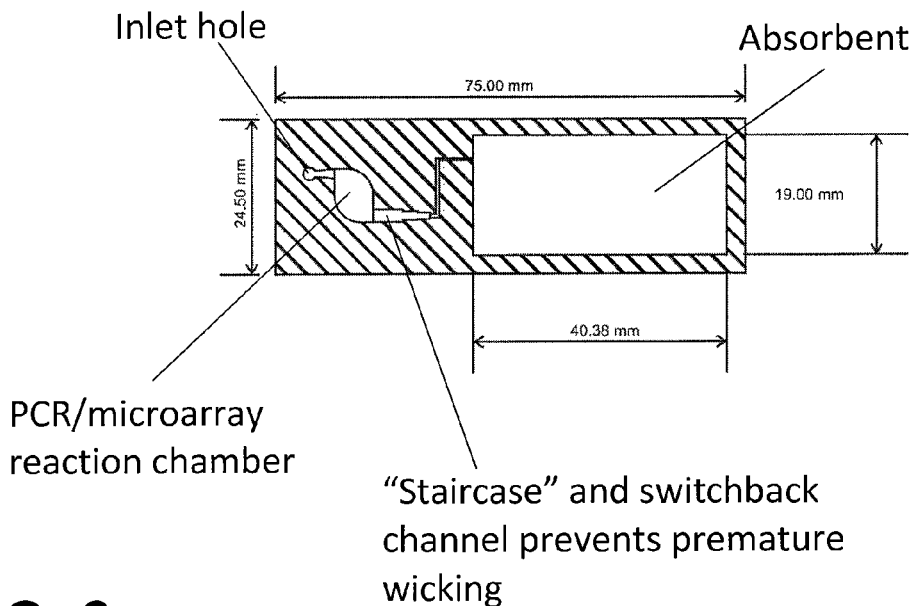
FIG. 8 is a schematic drawing showing the spacer tape for the assembly of FIG. 7.
Figure 9:
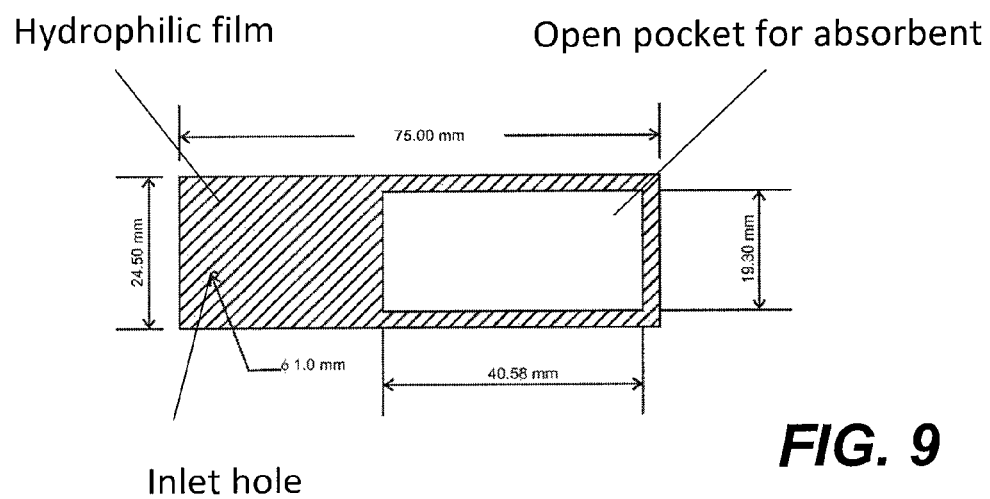
FIG. 9 is a schematic drawing showing the top film of the assembly of FIG. 7, which bonds to the adhesive of the spacer tape in FIG. 8.
Figure 10:
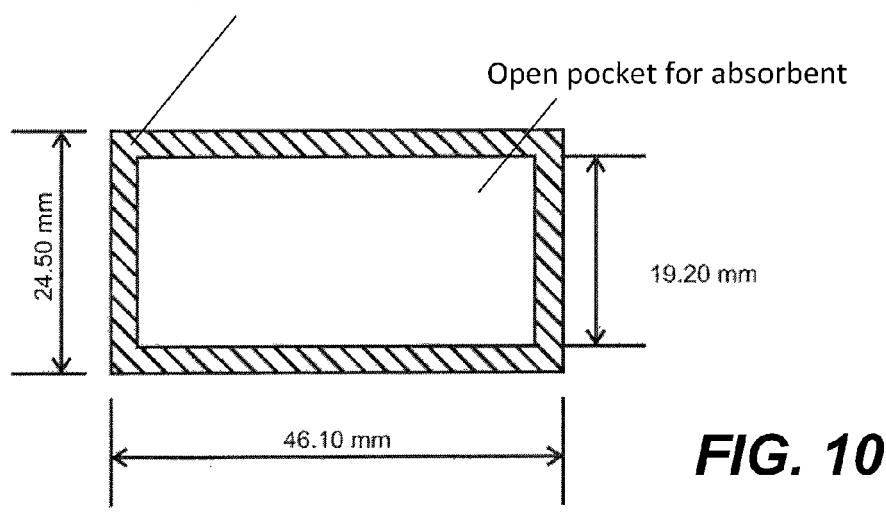
FIG. 10 is a schematic showing the spacer tape to allow for a thick absorbent.
Figure 11:
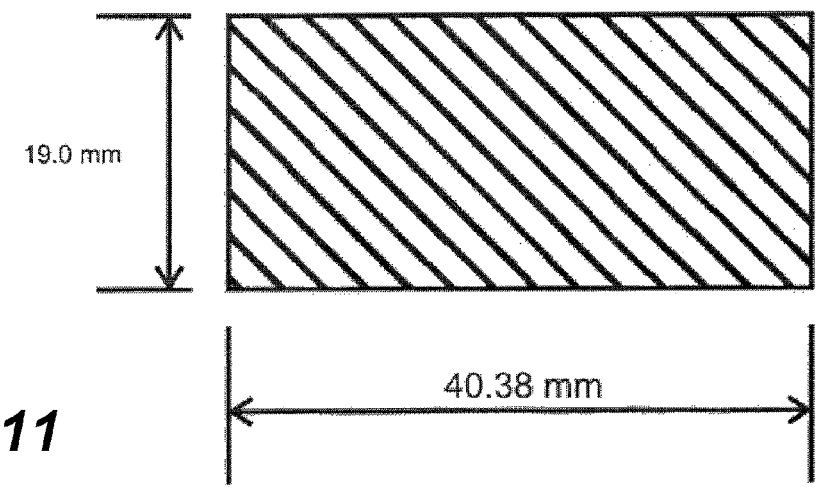
FIG. 11 is a schematic of an absorbent that fits in the pocket of the spacers in FIGS. 9 and 10.
Figure 12:
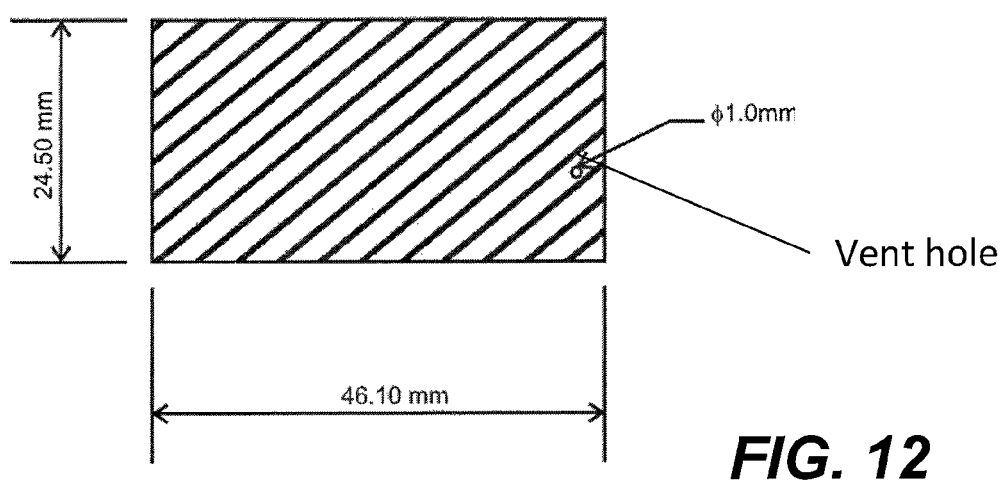
FIG. 12 is a schematic showing the cover for the waste chamber with a vent hole.

In another embodiment, the array substrate is glass or plastic. In yet another embodiment, the reaction chamber spacer 220 is a double-sided tape. In one embodiment, the connecting channel 223 has a "staircase and switchback" section. As shown in FIG. 8, the "staircase" section of the channel 223 has multiple subsections that are wider at the array chamber side and become stepwisely narrower at the waste chamber side. This "staircase" design prevents premature wicking. The "switchback" section of the channel 223 has a series of abrupt changes in channel width and/or sharp corners. These changes in channel width and sharp corners again create an unfavorable condition for the liquid to advance from the reaction chamber 221 to the waste chamber 225. In certain embodiments, a "sharp corner" refers to a corner formed by two channels intercepting at an angle of less than 135 degrees. In other embodiments, the walls of one of more subsections of the "staircase" section of the channel 223 are coated with a hydrophilic or hydrophobic coating, so as to cause a change in hydrophilicity between the walls of two neighboring subsections. In one embodiment, the subsection of the "staircase" section of the channel 223 that is proximal to the reaction chamber 221 is coated with a hydrophilic coating or polymer, while the next subsection is uncoated or coated with a hydrophobic coating. Such a hydrophilicity change would serve as a fluidic stop between subsections to prevent premature wicking.

A person of ordinary skill in the art would understand that the microarray system 200 may have many variations. For example, the reaction chamber 221, or the waste chamber 225, or both may be molded in aplastic substrate 210.

The sample purification function may be incorporated into the microarray system 200. In one embodiment, the inlet port 270 of the microarray system 200 further includes a sample purification matrix to purify or isolate a target molecule from a sample. Alternatively, the reaction chamber 221 of the microarray system 200 may further include a sample purification matrix to purify or isolate the target molecule from the sample. In one embodiment, the sample purification matrix is silica.

Depending on the target molecule, the microarray 211 can be an oligonucleotide array or a protein array. In one embodiment, the microarray 211 is an oligonucleotide array and the microarray system 200 is used for amplifying and detecting a target polynucleotide.

FIGS. 8-12 show dimensions of various components of the microarray system 200.

Figure 13:
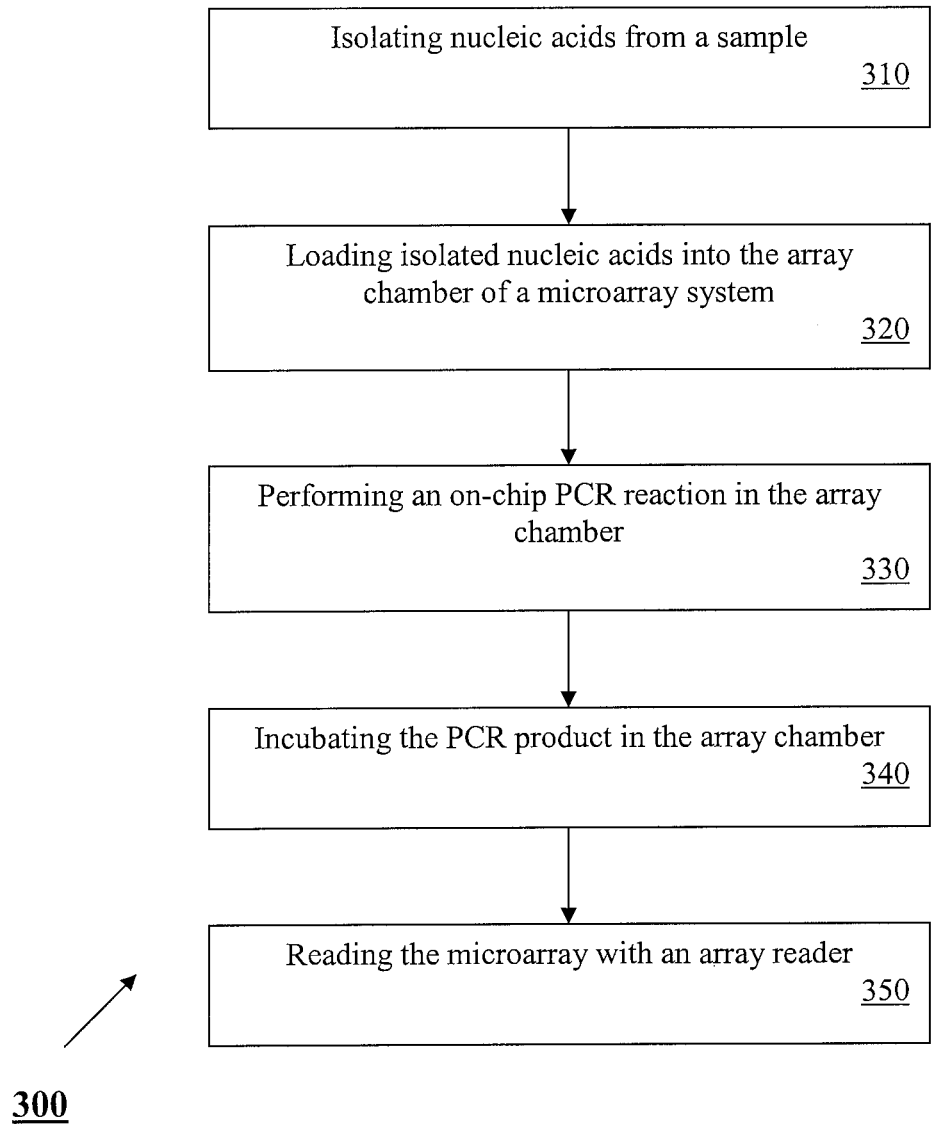
FIG. 13 is a flow chart showing a method for performing a sample analysis in a PCR-microarray system.

FIG. 13 is a flow chart showing an embodiment of a PCR array test 300. Briefly, total nucleic acids (DNA and RNA) are isolated from a sample (block 310), the purified nucleic acid is loaded into the array chamber of the microarray system 200 with an amplification mixture that contains a DNA polymerase, dNTPs and at least a pair of PCR primers (block 320). A PCR reaction is performed in the microarray system (block 330). The amplified product is allowed to hybridize to the microarray in the microarray system 200 (block 340) and the hybridization result is read by an array reader (350).

The sample can be any biological sample, such as swab, nasopharyngeal aspirate or whole blood samples. The total nucleic acids may be isolated using techniques well-known to a person of ordinary skill in the art. In one embodiment, the total nucleic acids are isolated with commercially available nucleic acid isolation reagents or kits, such as the Qiagen reagents. In another embodiment, the total nucleic acids are isolated with a sample preparation device developed by Akonni Biosystems. The generalized sequence of events for Akonni's sample preparation methods include denaturing the sample in a lysis buffer; continuous perfusion of the lysed sample over the sample preparation device; washing and eluting the nucleic acids from the sample preparation device.

The isolated nucleic acids are loaded into the microarray system 200 and amplified on-chip using methods well-known to one skilled in the art. After on-chip amplification, the microarray system 200 is incubated for a period of time at a desired temperature (e.g., 10-60 min at 50-65° C.) to allow the amplicons to hybridization to the microarray. After incubation, the microarray system 200 is washed (e.g., with water) and imaged on a microarray reader (e.g. Akonni's portable microarray reader). In one embodiment the microarray system is dried prior to imaging. In another embodiment, the drying procedure is accomplished with acetone introduction to the incubation chamber and/or heating the incubation chamber. In another embodiment, amplification of the isolated nucleic acids and labeling of the amplification products occur in an asymmetric PCR master mix containing fluorescently labeled "reverse" primers in large excess (e.g., 5-20 fold excess) over unlabeled, "forward" primers. This strategy generates predominantly single-stranded targets with a single label on their 5' end.

The array test 300 can be performed with many variations. In one embodiment, the amplified product remains in the reaction chamber after hybridization and there is no washing before imaging of the microarray. In another embodiment, the amplified product remains in the reaction chamber, and the array spots are imaged in real-time during hybridization in order to show growth curves as described by Khodakov et al. (Khodakov et al., 2008, BioTechniques, 44:241-248). In yet another embodiment, the reaction chamber supports a series of incubation and wash steps for multi-step assays such as ELISAs.

Figure 14:
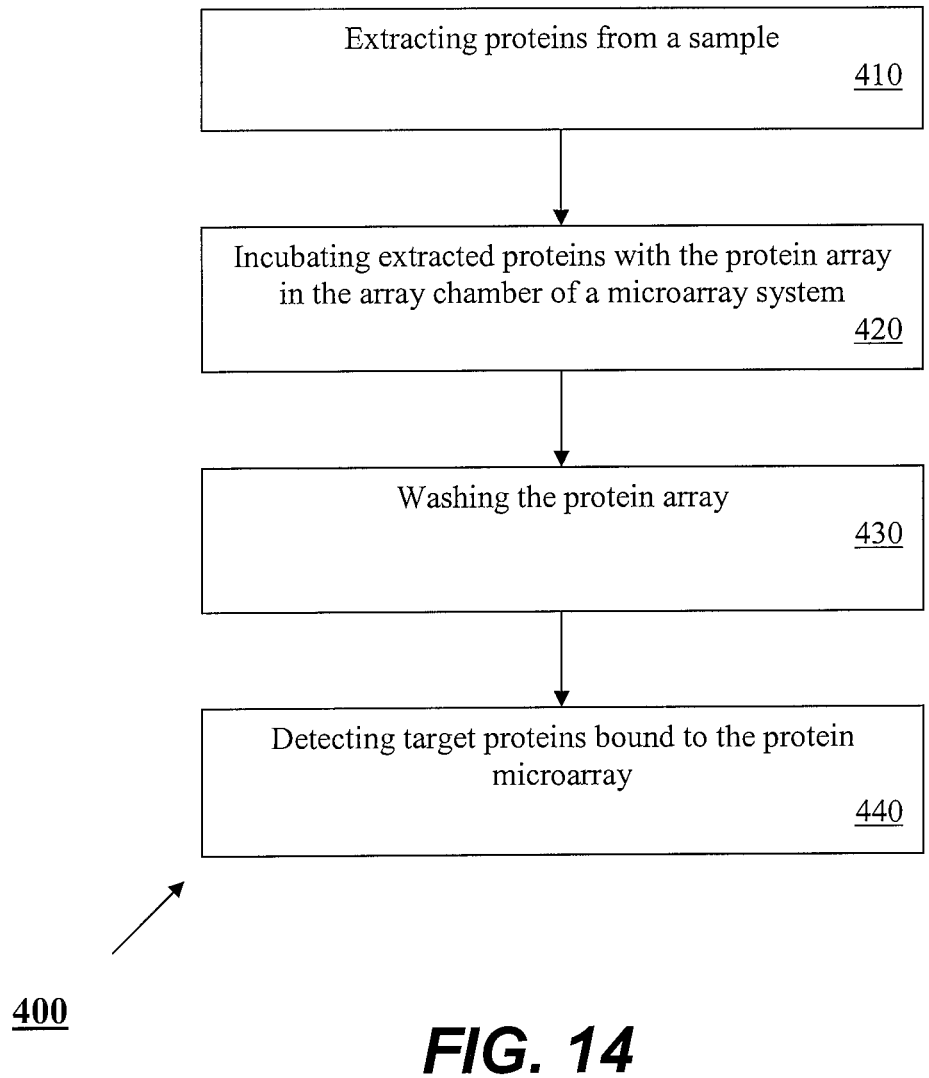
FIG. 14 is a flow chart showing a method for performing a sample analysis in a protein-microarray system.

In another embodiment, the microarray 211 is a protein array and the microarray system 200 is used for detecting a protein target. FIG. 14 is a flow chart showing an embodiment of a protein array test 400. Briefly, proteins are extracted from a sample (block 410), the extracted proteins are loaded into the array chamber and are incubated with the microarray in the microarray system 200 (block 420), the microarray is washed (block 430) and the protein targets bound to the microarray are detected using methods well-known to one skilled in the art (block 440).

In one embodiment, the incubation step 420 is performed under periodic or continuous vibration to improve interaction between the array elements and the target proteins.

Figure 15A:
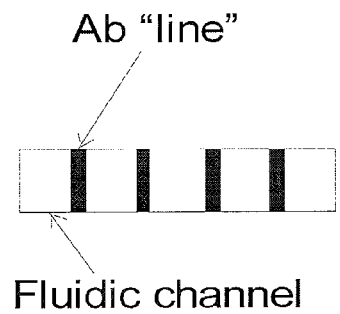
FIGS. 15A and 15B show embodiments of a "stripe protein array" and a protein-microarray system adopted to contain a "stripe protein array."
Figure 15B:
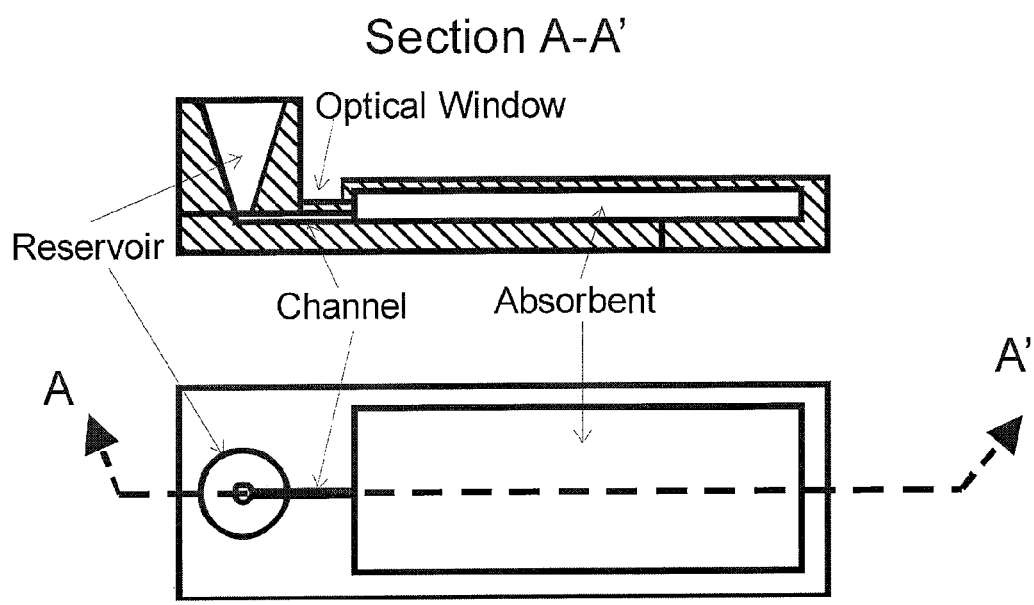

In another embodiment, the extracted proteins are continuously perfused over the protein array. In yet another embodiment, the protein array elements are arranged in the form of multiple stripes (protein strip array) in an elongated channel (FIG. 15A) so that the extracted proteins may be circulated through the channel during the incubation step to enhance interaction between the array elements and the target proteins. FIG. 15B shows an embodiment of a microarray system that contains a sample reservoir connected to a waste chamber through a channel. A protein array or a protein strip array is printed inside the channel. Proteins extracted from a sample is loaded into the reservoir and flows through the protein array in a continuous fashion to enter the waste chamber.

Preferably, the channel is a thin channel with a channel height in the range of 100-2000 μm, more preferably 200-500 μm. Porous gel lines would be formed on the flow path so that the samples are continuous perfused through or across the porous gel lines. Continuous perfusion in a very thin channel would offer rapid diffusion kinetics in one dimension, disrupt the diffusion boundary layers and increase convective transfer to enhance interaction between the array elements and the target proteins. Large volumes could be perfused at a flow rate controlled by pressure and/or an absorbent to improve sensitivity. The 3D profile of the gel elements also provide more favorable diffusion kinetics than standard 2D Ab attachment because they penetrate into the flow path. Sufficiently thin channels with 3D hemispherical gel drops could also be designed to promote rapid diffusion kinetics, which has been shown to be as fast as seconds (Rossier et al, Langmuir 2000) In one embodiment, the gel lines have a porosity in the range of 0.5 nm to 0.5 μm.

In the thin channel design, the spacer tape needs to be thin and have a low background fluorescence to prevent overshine into the channel. The cover above the channel need to be hydrophilic and sufficiently rigid so that it would not bend into the channel and damage the gel stripes of the protein array.

EXAMPLES

Example 1

Covering Incubation Chamber with Hydrophilic Tape Resulted in Complete Filling of the Chamber Microarray slides as shown in FIG. 3 were constructed. The slides had a length of 2.95 inches and a width of 0.75 inch. A channel 14 of 0.5 mm in width connects the filling inlet port 11 to the microarray incubation chamber 10, a 2.0 mm channel 12 connects the microarray incubation chamber 10 to the waste chamber 60, and a 1.0 mm channel 64 from the waste chamber 60 to the outside serves as a vent. The microarray incubation chamber 10 has a size of 10 mm×10 mm. An inner gasket tape, with a thickness of 0.25 mm (available from 3M, Part No. 9087), was laser cut to form a gasket with the geometry described above. The gasket was placed on a hydrophobic surface with a contact angle that is similar to slides used for the gel spot printing process. The top of the gasket was sealed with a hydrophilic tape (AR 90128) to provide a hydrophilic surface. Thirty microliters of water filled the chamber uniformly without leaving air bubbles or air pockets. Thirty microliters of hybridization buffer (3 M guanidine thiocyanate, 150 mM HEPES pH 7.5, and 15 mM EDTA) also filled the chamber uniformly without air bubbles. A similar test with a hydrophobic tape (AR 8192) left air pockets in the microarray chamber due to non-uniform filling.

This experiment demonstrated that the hydrophilic surface of the chamber overcomes the surface tension of the liquid and allows complete filling of the chamber, including the square edges. This result is surprising since square corners typically trap air pockets as liquid fills the chamber.

Example 2

Evaluation of the Wicking Efficiency of the Waste Chamber

Figure 16A:
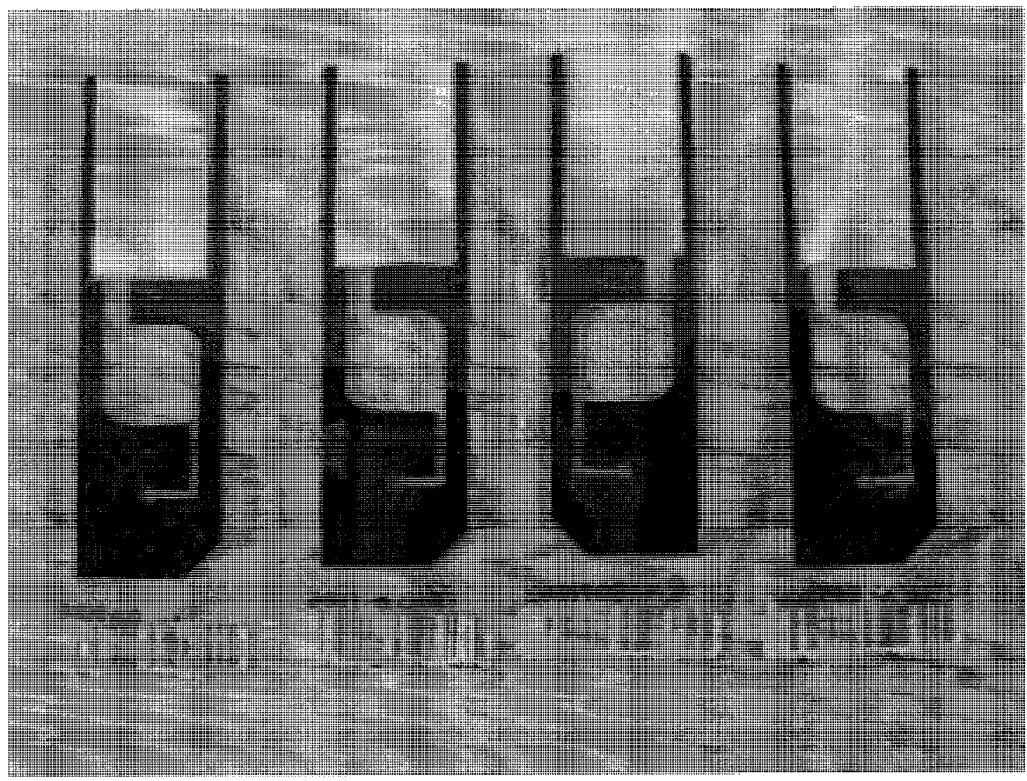
FIG. 16A is a picture showing four microarray incubation chamber assemblies used to evaluate wicking of the liquid into the waste chamber.

FIG. 16A shows four test microarray slides, each having a hydrophilic incubation chamber connected to a waste chamber containing an absorbent. The waste chambers were vented to atmosphere. The chambers were formed by placing a gasket (laser cut from double sided tape provided by Grace Biolab) on top of a microarray supporting slide. The hydrophilic surface in the incubation chamber was produced by covering the incubation chamber space with a hydrophilic tape (AR 90469). The absorbent was from Millipore (C048). Ninety-five microliters of sample containing amplified product from *Yersinia pestis*, hybridization markers, BSA and a hybridization buffer were denatured at 95° C. for 5 minutes and introduced into the incubation chamber through an inlet port. The inlet port was then sealed with tape (AR90697). The reaction was incubated at 50° C. for one hour in an MJ Research PTC-200 DNA Engine thermalcycler with attached slide tower. The microarray slides were removed from the tower and washed at room temperature with 150 μL of water. As water was added into the incubation chamber through the inlet port, the liquid in the incubation chamber was pushed into the waste chamber through the channel connecting the incubation chamber with the waste chamber. Once the contact was established between the liquid inside the incubation chamber and the absorbent in the waste chamber, the absorbent was able to wick out the liquid (including the washing volume) from the incubation chamber. The microarray slide was then heated at 95° C. for 20 minutes to thoroughly dry the incubation chamber. The microarray was imaged on an Aurora Photonics Port Array 5000™ without any manipulation to the device. The image was taken through the hydrophilic tape that covers the incubation chamber.

Figure 16B:
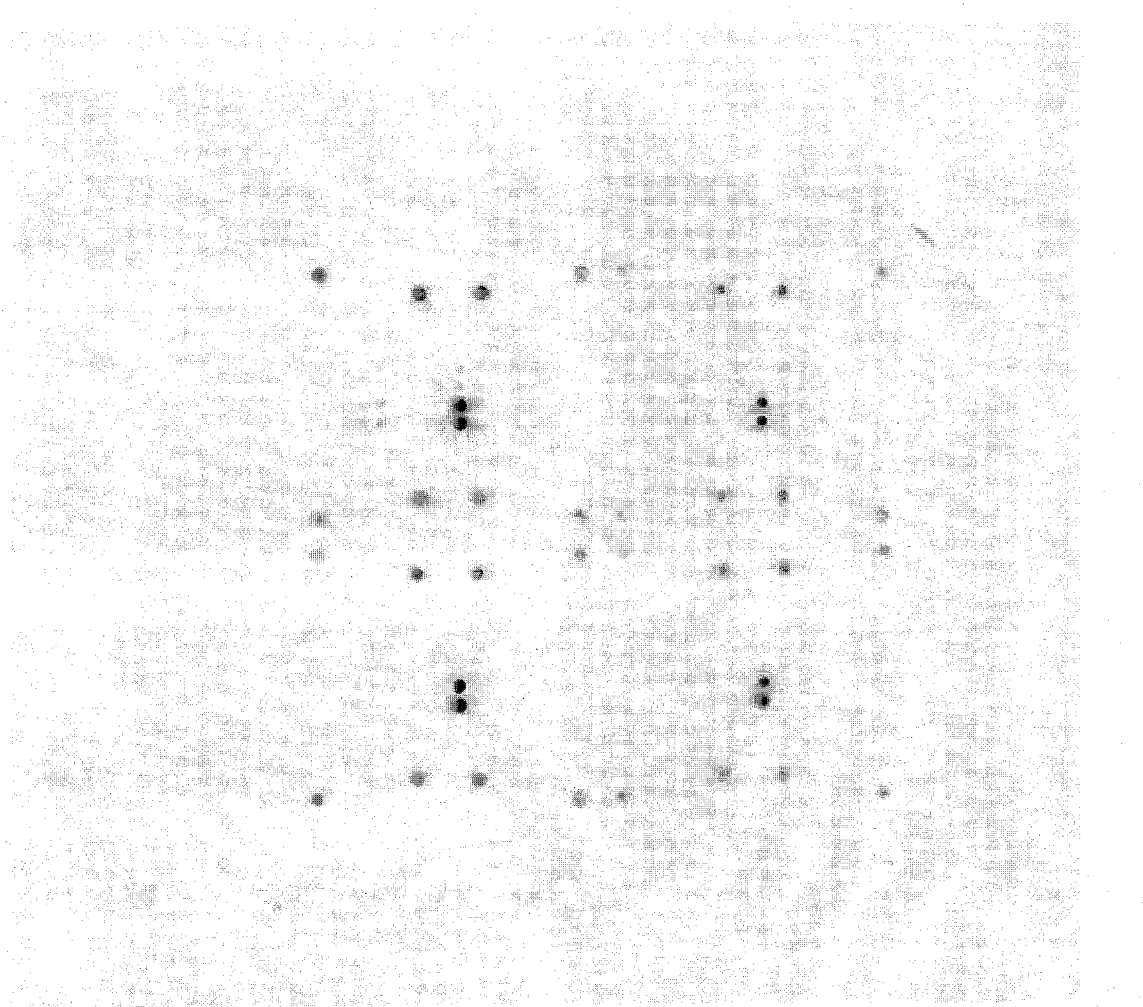
FIG. 16B is a picture showing the hybridization results using the microarray incubation chamber assembly of FIG. 16A.

FIG. 16B shows the image of an example microarray after the hybridization, washing, and drying step. Product spots are shown as dark black dots. Control spots include Cy3 spots and hybridization markers. Each array is a replicate of four subarrays, hence the four sets of Yp product spots. Uniform hybridization was achieved in all test slides.

Example 3

Figure 17A:
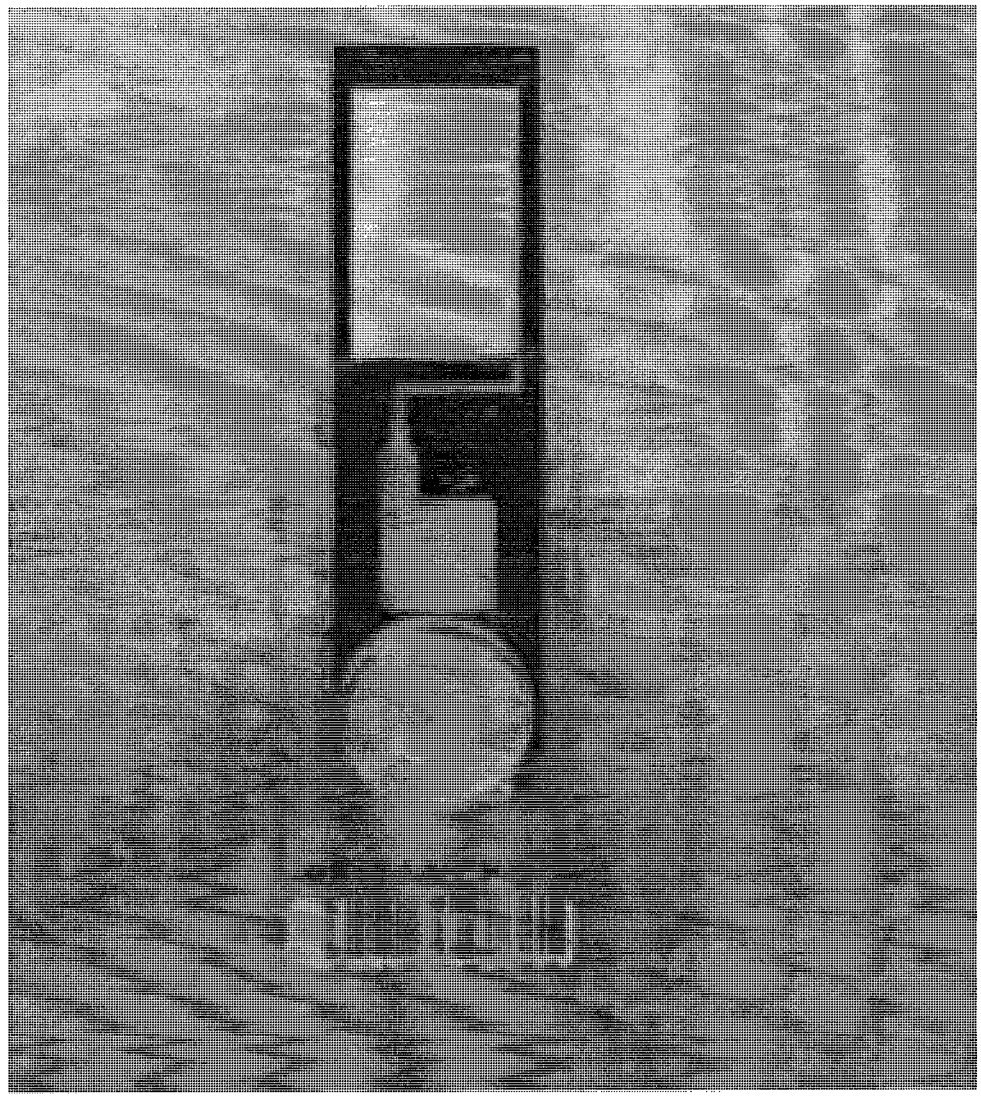
FIG. 17A is a picture showing an embodiment of an integrated microarray system.
Figure 17B:
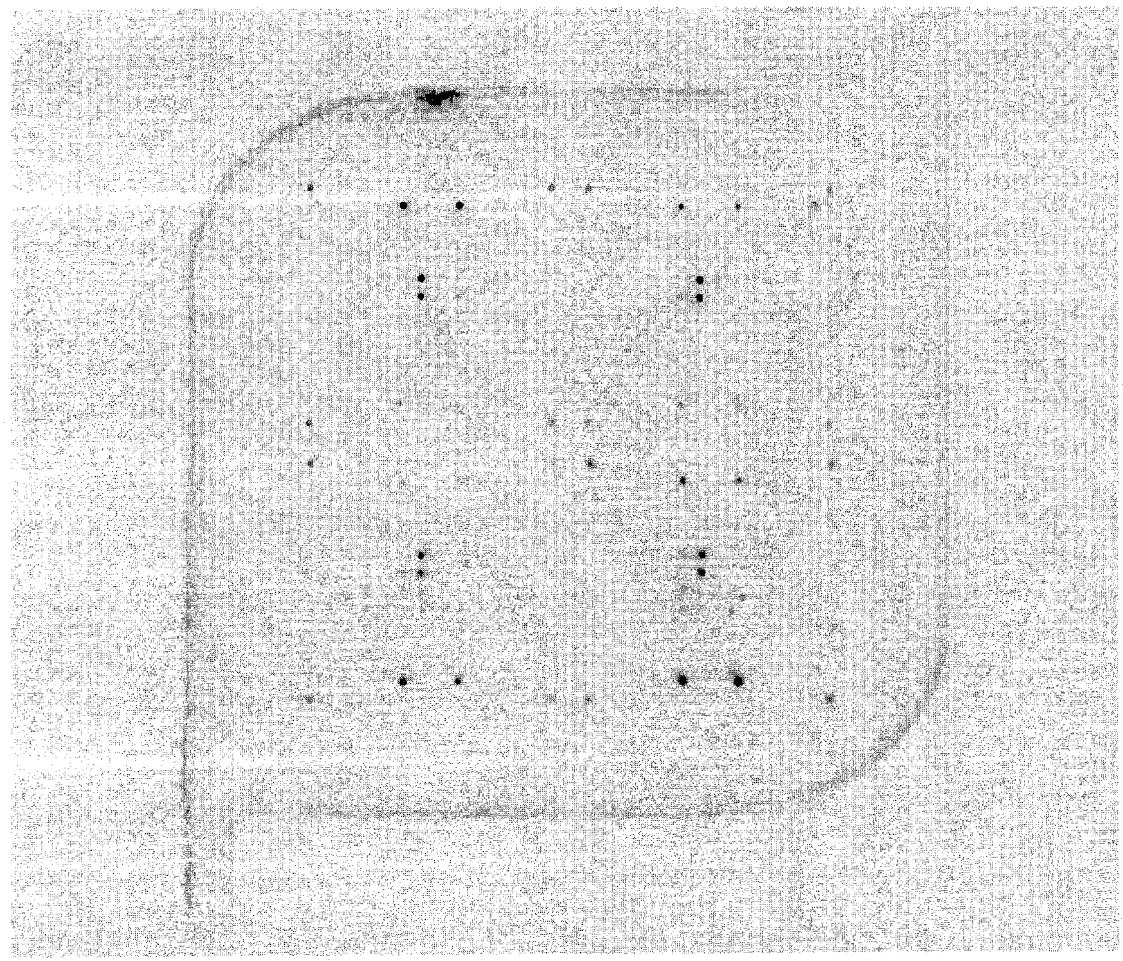
FIG. 17B is a picture showing and the hybridization results from the microarray system of FIG. 17A.
Figure 18A:
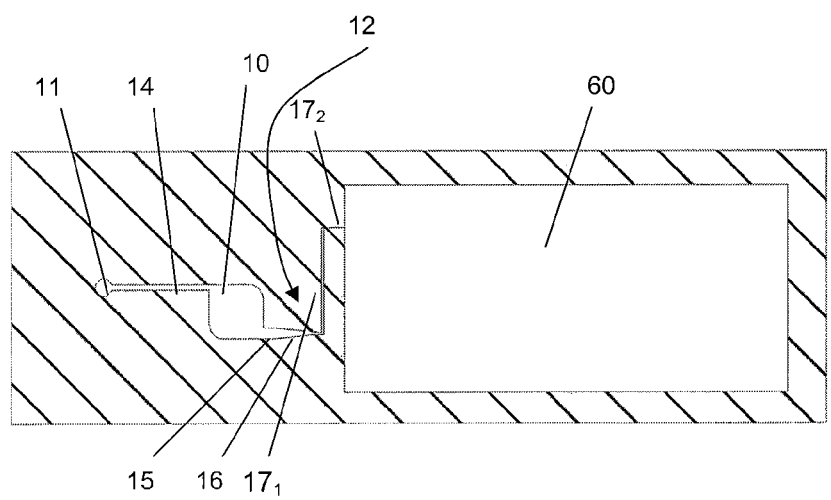
FIG. 18A is a schematic of an embodiment of a microarray system.
Figure 18B:
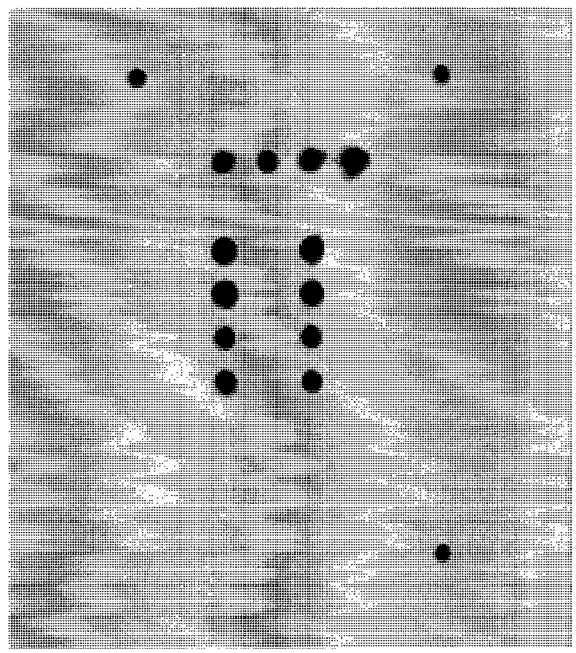
FIG. 18B is a picture showing and the hybridization results from the microarray system of FIG. 18A.
Figure 19:
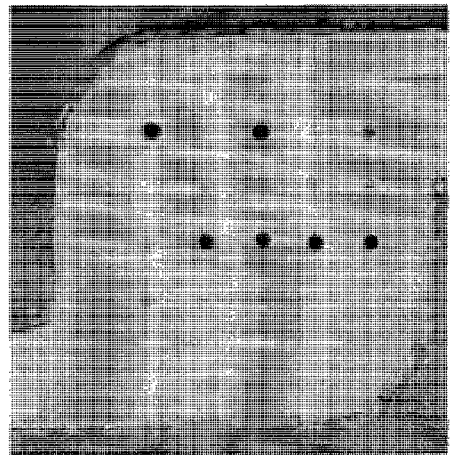
FIG. 19 is a composite showing the chip map, the protein array system, and a representative array image of Example 6.
Figure 19:
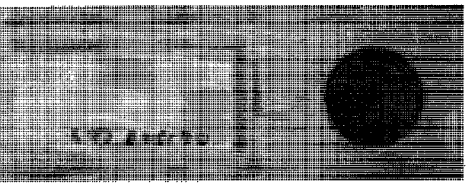

Microarray System Containing a Dome Valve, a Hydrophilic Incubation Chamber and a Waste Chamber FIG. 17A shows an embodiment of an integrated microarray system having an incubation chamber covered with a hydrophilic tape, a waste chamber with incorporated absorbent, and a dome valve connected to the incubation chamber. Ninety-five microliters of sample consisting of hybridization master mix and *Yersinia pestis* product were denatured at 95° C. for 5 minutes and introduced into the incubation chamber through the dome valve with a Rainin P200 uL pipettor. The sample uniformly flowed into the microarray chamber without leaving air bubbles or air pockets. The incubation chamber was heated for 60 minutes at 50° C. on an MJ Research PTC-200 DNA Engine thermalcycler with attached slide tower without any changes to the flow cell device. The microarray slide was removed from the slide tower and washed with 150 ul of water. As the water was introduced into the incubation chamber, the hybridization mixture inside the incubation chamber was pushed into the waste chamber and the Millipore C048 absorbent wicked out the entire volume of liquid from the incubation chamber. The microarray slide was then heated at 95° C. for 20 minutes to thoroughly dry the incubation chamber. The microarray was imaged on an Aurora Photonics Port Array 5000™ without any manipulation to the device. The image was taken through the hydrophilic tape that covers the incubation chamber.

FIG. 17B shows the image of an exemplary microarray after the hybridization, washing, and drying step. Product spots are shown as dark black dots. Control spots include Cy3 spots and hybridization markers. Each array is a replicate of four subarrays, hence the four sets of Yp product spots. As shown in FIG. 8B, uniform hybridization was achieved in all subarrays.

Example 4

Microarray System Containing a Hydrophilic Incubation Chamber and a Waste Chamber FIG. 18A shows another embodiment of a microarray system having a hydrophilic chamber 10 and a waste chamber 60. The two chambers are connected by a channel 12 having an inlet section 15, a funnel shape connecting section 16, a large diameter outlet section $\mathbf{17}_1$ and a small diameter outlet section $\mathbf{17}_2$. Liquid sample is added to the incubation chamber 10 through inlet port 11 and channel 14.

The microarray system shown in FIG. 18A was constructed on a glass slide using a gasket which was laser cut from double sided tape (Grace Biolabs). The waste chamber 60 contained a filter paper absorbent (CF4, Millipore) and was vented to the atmosphere. The resulting microarray assembly was covered with Lexan HPFAF (0.007"/175 μm) antifog tape (GE Plastics). Twenty microliters (20 μl) of sample containing amplified product from *Streptococcus pyogenese*, hybridization markers (positive control), BSA and a hybridization buffer were denatured at 95° C. for 5 minutes and introduced into the incubation chamber 10 through the inlet port 11 using a Rainin P200 uL pipettor. The inlet port 11 was sealed with tape and the entire slide was allowed to incubate at 55° C. for 30 minutes in an MJ Research PTC-200 DNA Engine thermocycler with attached slide tower. The slides were removed from the tower and washed at room temperature with 150 ul of water. The array was imaged on an Aurora Photonics Port Array 5000™ microarray reader (2 second exposure time). FIG. 18B shows the hybridization result. FIG. 18C is a chip map showing the layout of array spots. As shown in FIG. 18B, strong positive results were obtained from the hybridization control and *Streptococcus* specific probes.

Example 5

One-Step Protein Microarray System

A one-step, integrated protein microarray system, such as one of the embodiments shown in FIG. 5 and FIG. 18A, is constructed using gel drop elements containing capture antibodies. The capture antibodies are antibodies that bind specifically to a panel of biological warfare agents (BWAs). Each gel spot contains an antibody that binds to a specific BWA. A set of colloidal gold labeled secondary antibodies are placed at a location near the inlet channel. The secondary antibodies recognize the same panel of BWAs. When a liquid sample is loaded into the incubation chamber through the inlet channel, the colloidal gold labeled secondary antibodies are mixed with the sample as the sample enters the incubation chamber. During incubation, the BWAs of interest are captured by the antibodies in the array gel spot and the secondary antibodies bind to the captured BWAs. After the incubation period, unbound secondary antibodies are washed away. The secondary antibodies bind to the BWAs captured on the gel spots and produce positive signals in the microarray.

The term "antibody" as used herein, is used in the broadest possible sense and may include but is not limited to an antibody, a recombinant antibody, a genetically engineered antibody, a chimeric antibody, a monospecific antibody, a bispecific antibody, a multispecific antibody, a diabody, a chimeric antibody, a humanized antibody, a human antibody, a heteroantibody, a monoclonal antibody, a polyclonal antibody, a camelized antibody, a deimmunized antibody, an anti-idiotypic antibody, and/or an antibody fragment. The term "antibody" may also include but is not limited to types of antibodies such as IgA, IgD, IgE, IgG and/or IgM, and/or the subtypes IgG1, IgG2, IgG3, IgG4, IgA1 and/or IgA2. The term "antibody" may also include but is not limited to an antibody fragment such as at least a portion of an intact antibody, for instance, the antigen binding variable region. Examples of antibody fragments include Fv, Fab, Fab', F(ab'), $F(ab')_2$, Fv fragment, diabody, linear antibody, single-chain antibody molecule, multispecific antibody, and/or other antigen binding sequences of an antibody. Additional information may be found in U.S. Pat. No. 5,641,870, U.S. Pat. No. 4,816,567, WO 93/11161, Holliger et al., Diabodies: small bivalent and bispecific antibody fragments, PNAS, 90: 6444-6448 (1993), Zapata et al., Engineering linear $F(ab')_2$ fragments for efficient production in *Escherichia coli* and enhanced antiproliferative activity, Protein Eng. 8(10): 1057-1062 (1995), which are incorporated herein by reference.

Example 6

Multi-Step Protein Microarray System

A multi-step, integrated protein microarray system was constructed using gel drop elements containing antibodies. The chip map for the array is shown in FIG. 19 (top left panel). Glass slides with printed gel drops were blocked with PBS containing 1% BSA for 1 hour at room temperature. The slides were rinsed with DI water and allowed to air dry in a dust-free environment. The microarray system was then assembled with the blocked glass slide, laser cut 256M tape from Adchem, hydrophilic Lexan film, and a dome valve. FIG. 19 shows a picture of a microarray slide used in the experiment. Approximately 20 µl of SEB (1 ug/mL in PBS with 0.05% Tween-20 and 1% BSA) was pipetted through the dome valve into the microarray system and incubated for 60 minutes at room temperature. The microarray system was rinsed by pipetting 20 µl of DI water (×2) and subsequently dried with air using the pipettor. 30 µl of PBS with 0.05% Tween-20 (PBST) was pipetted into the microarray systems and subsequently dried with air using a pipettor. 20 µl of anti-SEB monoclonal antibody dilution in PBST with 1% BSA was pipetted into the microarray system and allowed to incubate for 30 minutes at room temperature. 20 µl of DI water (×2) was pipetted into the microarray system and dried with air using the pipettor. 30 µl of PBST was pipetted into the microarray system and dried with air using the pipettor. 20 µl of Alexa 568 labeled anti-mouse at 2 µg/ml in PBST with 1% BSA was pipetted into the microarray system and allowed to incubate for 30 minutes at room temperature. The microarray system was protected from light. 20 µl DI water (×2) was pipetted into the microarray system. 100% ethanol was pipetted into the incubation chamber of the micro array system, and residual ethanol wicked into the absorbent. The microarray system was then heated at 55° C. for 10 minutes. The microarray system was imaged using a green laser (532 nm) with 605 nm filter on Aurora PortArray 5000. A representative image of the protein array is shown in FIG. 19 (lower right panel).

In this embodiment, an air bubble is left in the channel, connecting the incubation chamber to the waste chamber to separate the liquid in the incubation chamber from the waste and prevent premature wicking.

Example 7

PCR-Microarray System

Total nucleic acids (DNA and RNA) are isolated from up to 1 ml of swab, nasopharyngeal aspirate or whole blood sample on an Akonni sample preparation device or customer-preferred sample preparation kit (e.g. Qiagen reagents). The generalized sequence of events for Akonni's sample preparation methods include sample denaturation in lysis buffer; continuous perfusion of lysed sample over the sample preparation device; washing; and nucleic acid elution in ~100 µl final volume. The eluted sample is loaded into a microarray system having dimensions shown in FIGS. 8-12. Target amplification and labeling occurs in an asymmetric PCR master mix containing fluorescently labeled "reverse" primers in 10-fold excess over unlabeled, "forward" primers. This strategy generates predominantly single-stranded targets with a single label on their 5' end. After on-chip amplification, amplicons are then incubated for 30 min at 50-65° C. in the microarray system assembly. After incubation, the microarray system is perfused with water (all waste is retained within the microarray system).

FIG. 8 shows the inlet hole of the microarray system assembly. The inlet hole in the spacer tape ranges from 2.0 to 4.0 mm whereas the cover film hole diameter ranges from 0.8 to 1.2 mm. The difference in diameter allows the reagents to be drawn into the chamber via capillary action. If these diameters are the same, the hydrophobic walls of the spacer tape create an unfavorable condition for capillary action to draw in the sample. Additionally, the channel width of the inlet channel increase as it approaches the reaction chamber. This increase is to allow the liquid to enter the chamber without having to make a sharp turn to enter the chamber. Sharp turns require the contact line of the advancing front to have a discontinuity, which serves to block the liquid from entering the waste chamber. Square corners are used in the connecting channel to prevent the liquid from leaving the reaction chamber.

The corners of the reaction chamber are rounded to accommodate filling at high flow rates in which viscous flow dominates over surface-driven flow. During this condition, the corners can be susceptible to air pockets. Additionally, when the reaction is complete and the reaction chamber is washed, the wash buffer wicks into the reaction chamber. The receding front typically leaves remaining liquid in the chamber along the edges and gradually depletes the edges. Thus, the rounded corners reduce the time for completely removing all of the liquid from the chamber.

The connecting channel consists of two sections, a "staircase" overflow section, and a "switchback" section. The "staircase" section has changes in channel dimensions, starting with 2.0 mm and decreasing to 0.6 mm, to create corners, which range from 45 to 135 degrees. More specifically, these corners are 90 degrees. The switchback section has a series of decreasing channel widths also with 90 degree turns. These turns again create an unfavorable condition for the liquid to advance. The decrease in diameter creates a higher capillary pressure as the liquid approaches the waste chamber. The increased capillary tension as the liquid approaches the waste chamber minimizes the effects of bubbles that are in the fluidic path. If a bubble has the same radius of curvature at the outlet of the connecting channel as the receding contact line of the liquid then the liquid will not advance. If however, the bubble has a smaller radius of curvature than the receding contact line of the liquid than the liquid will continue to flow into the waste chamber. Thus, a small 0.3 mm channel connects to the waste chamber. Channels 0.2 mm or smaller create a condition in which liquid around the edges accumulate and combine. If the liquid combines from both sides of the channel, the liquid advances and begins to deplete the reaction chamber. The absorbent in the waste chamber presses against the connecting channel so that the absorbent is in direct fluidic communication with the connecting channel.

The inlet port is 0.75 mm thick and 0.9 to 1.1 mm in inner diameter and 6.35 mm outer diameter. This diameter conforms to a P20 and P100 pipette tip without the tip contacting the array substrate and occluding the flow. A foil circle or tab with a silicone adhesive bonds to the inlet port. Silicone is compatible with solvents such as acetone, used to dry the microarray system. The foil is pierceable with a pipette tip. The foil circle or tab is applied after the reaction chamber is filled with sample and PCR master mix. Following amplification, the foil is pierced to allow the reaction chamber to be washed. The absorbent prevents liquid from escaping the microarray system assembly following the wash steps. A vent hole on the distal side of the waste chamber is left open to allow the liquids to be introduced without requiring additional steps. Half of the vent hole is exposed to the waste chamber and the other half is covered by the gasket. The foil circle can be on a kiss-cut role that is pealed from a release liner and applied to the inlet port, or a foil tab can reside on the microarray system assembly with a release liner on a portion of the tab. The foil tab is applied to a position on the microarray system assembly during manufacturing such that when the release liner is removed, the tab covers the inlet port.

Example 8

Detection of MRSA Targets on PCR-Microarray System with a Glass Substrate and Image a Dried Incubation Chamber The objective of this experiment is to perform a multiplex reaction in the microarray system assemblies. Glass slides (25×75×1 mm) with a conformal coating from Erie Scientific are used as the array substrates. Oligonucleotide probes are covalently crosslinked to a polymer backbone instead of the solid substrate in a single-step, UV-induced co-polymerization reaction as described by Rubina et al. (See e.g., Rubina, et al. 2003, BioTechniques 34:1008-1022, and Rubina, et al., 2004. Anal. Biochem. 325:92-106) which are incorporated herein by reference).

Methicillin-resistant *S. aureus* organisms (MRSA) are obtained in culture form from ATCC and *Streptococcus pyogenes* (*S. pyog*) was obtained in culture form from a collaborator, and then purified with Akonni's TruTip (Cat No. 300-10206). The TruTip protocol, which takes approximately four minutes, consists of cycling five times up and down with an electronic pipettor for each of the following steps: binding, washing, drying, and eluting. The quantity of DNA is determined with a NanoDrop 3300 Fluorospectrometer (Wilmington, Del.).

Figure 20:
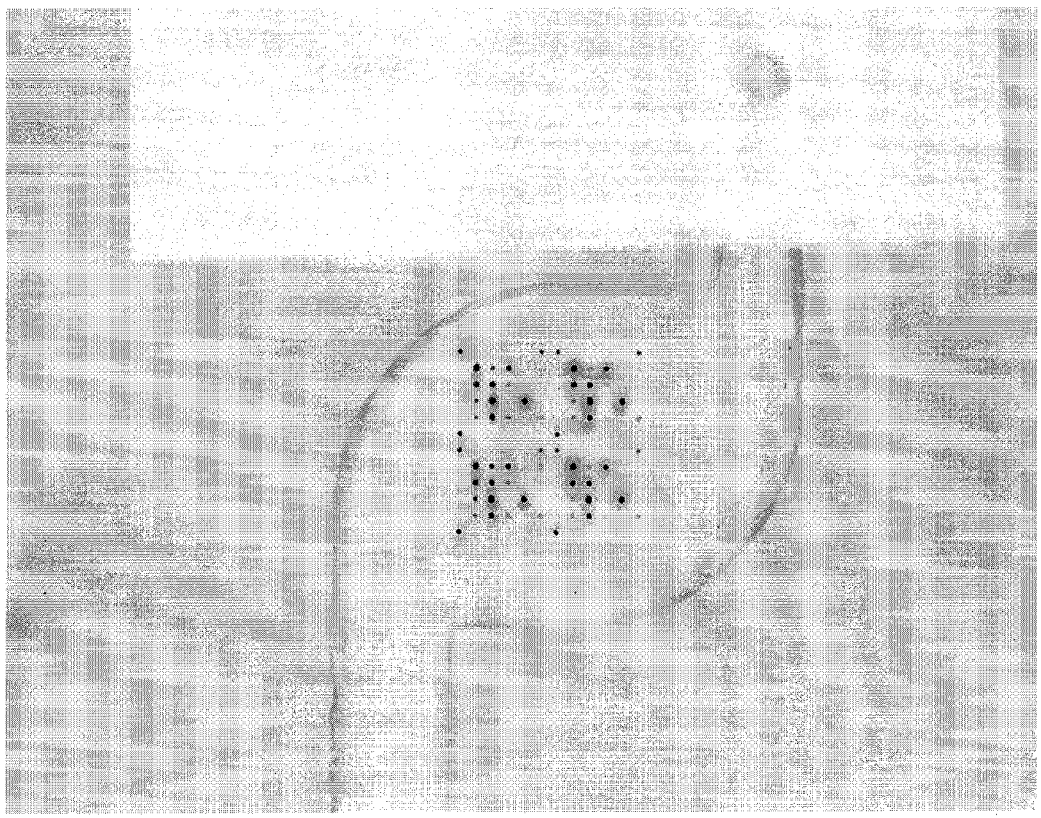
FIG. 20 shows the results of purified 300 pg of MRSA targets, amplified on a microarray system with a glass substrate with a subsequent wash and drying step.

FIG. 20 shows amplification of MRSA nucleic acid performed on the MRSA Chip (v4.0) in the microarray system design of FIGS. 7-12. 300 pg of MRSA DNA is amplified in a multiplex reaction using the primer sets for mecA, tufA-3b, SCCmec and M13. The image is acquired with an Aurora Port Array 5000. The arrays had the chip map shown in FIGS. 21A and 21B. The microarray system assemblies contained a laser cut filter paper absorbent in the waste chamber (Whatman 31ET CHR Cellulose Chromatography Paper, 0.5 mm). The top side (hydrophobic side) of the hydrophilic cover film was cleaned with IPA after assembly. The master mix preparation is as follows: 14 µl of master mix containing the MRSA 4-plex primers (mecA, tufA-3b, SCCmec, M13) and 1.0 µl of Methicillin-resistant *S. aureus* (MRSA) nucleic acid were prepared for each reaction (300 pg total DNA amplified in a 15 µl reaction volume) using the Qiagen Taq® DNA Polymerase kit (Qiagen, cat#201205) with 10% formamide added. 14 µl of the prepared reaction mix is added to the microarray system. The sample inlet port was covered with a foil tape pull-tab with an adhesive backing and the waste chamber vent was left open. All the slides were placed on the MJ Research PTC-200 DNA Engine thermocycler with attached slide tower and were amplified following the amplification parameters: 86.5° C. for 2 min, and 35 cycles of 86.5° C. for 45 sec, 50° C. for 1 min 30 sec, and final steps of 65° C. for 5 min, 85° C. for 2 min and 40° C. for 45 min. After amplification, the slides are removed from the slides tower and the foil tape covering the sample inlet port was then pierced and the array was washed with 35 µl of 1×SSPE in a single wash. The slides are then washed with 25 µl of water followed by 75 µl of 100% acetone. The slides are then dried on the custom heat block designed for a ThermoFisher 2001FSQ digital controlled dry bath for 15 minutes at 50° C. and read dry on the PortArray 5000 readers.

Example 9

Figure 22:
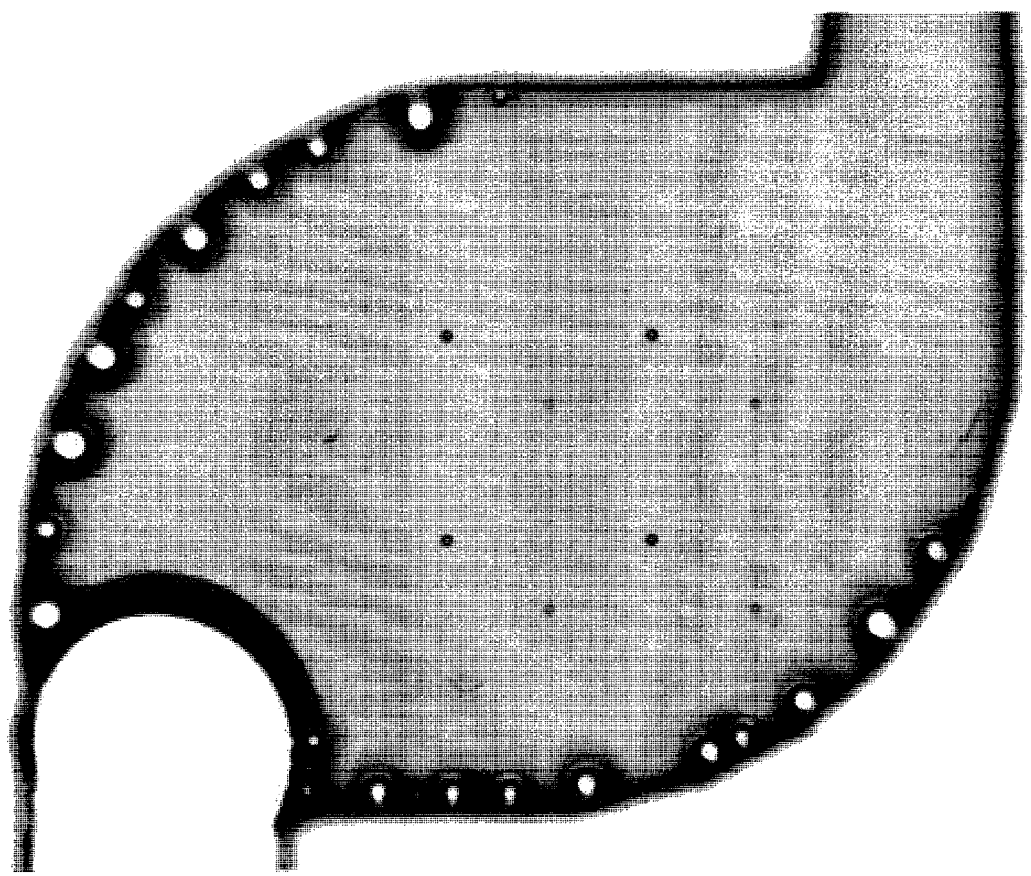
FIG. 22 shows the results of purified 1 ng MRSA targets, amplified on a microarray system with a glass substrate with a subsequent read in liquid.

Detection of MRSA Targets on PCR-Microarray System with a Glass Substrate and Image in Liquid The objective of this experiment is to perform a singleplex reaction in the microarray system assemblies. Glass slides (25×75×1 mm) with a conformal coating from Erie Scientific are used as the array substrates. Oligonucleotide probes are covalently crosslinked to a polymer backbone instead of the solid substrate in a single-step, UV-induced co-polymerization reaction as described by Rubina et al. (supra). FIG. 22 shows amplification of Methicillin-resistant *S. aureus* (MRSA) nucleic acid performed on the MRSA Chip (v4.0) in the microarray system design of FIGS. 7-12. One nanogram of MRSA DNA is amplified in a singleplex reaction using the mecA primers. The image is acquired with a GenePix 4000B. The arrays had the chip map shown in FIGS. 21A and 21B. The flow cells contained a laser cut filter paper absorbent in the waste chamber (Whatman 31ET CHR Cellulose Chromatography Paper, 0.5 mm). The top side (hydrophobic side) of the hydrophilic cover film was cleaned with IPA after assembly. The Master Mix Preparation is as follows: 11.7 µl of master mix containing the mecA primers and 3.3 µl of Methicillin-resistant *S. aureus* (MRSA) nucleic acid were prepared for each reaction (1 ng total DNA amplified in a 15 µl reaction volume) using the Qiagen Taq® DNA Polymerase kit (Qiagen, cat#201205, http://www1.qiagen.com) with 10% formamide added. 14 µl of the prepared reaction mix is added to the microarray system. The sample inlet port was covered with a foil tape pull-tab with an adhesive backing and the waste chamber vent was left open. All the slides were placed on the MJ Research PTC-200 DNA Engine thermocycler with attached slide tower and were amplified following the amplification parameters: 86.5° C. for 2 min, and 35 cycles of 86.5° C. for 45 sec and 50° C. for 1 min 30 sec, and final steps of 65° C. for 5 min, 85° C. for 2 min and 40° C. for 45 min. After amplification, the slides are removed from the slide tower and imaged with liquid remaining in the array chamber with a GenePix 4000B. Note that the bubbles adhere to the hydrophobic walls of the spacer tape rather than the center of the array.

Example 10

Figure 23:
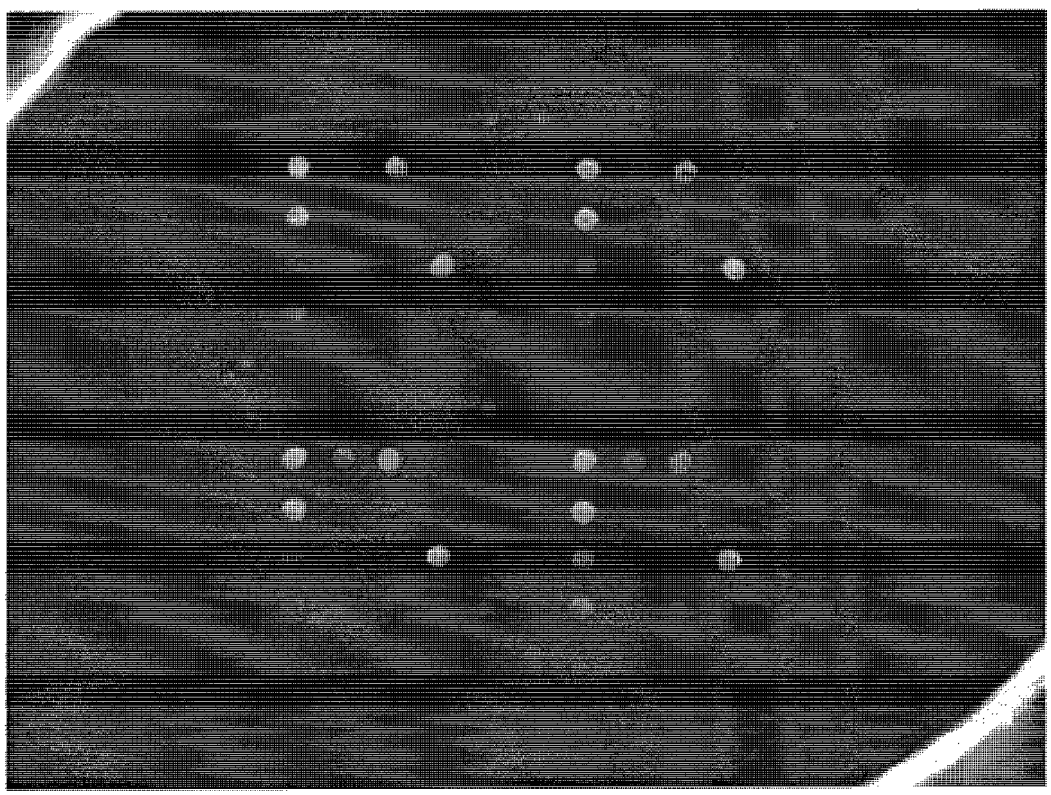
FIG. 23 shows results of purified 300 pg MRSA targets on a plastic substrate without a drying step.

Detection of MRSA Targets on PCR-Microarray System with Plastic Slide Without a Drying Step The objective of this experiment is to evaluate plastic slides on the Akonni and GenePix imagers. Plastic slides were molded in a 25.4 mm×76.2 mm×1 mm mold. Gel elements were printed directly on the plastic and UV cross-linked prior to the experiment. FIG. 23 shows amplification of Methicillin-resistant *S. aureus* (MRSA) nucleic acid performed on the MRSA Chip (v4.0) in the microarray system design of FIGS. 10 and 14-18. 300 pg of MRSA DNA is amplified in a multiplex reaction using the mecA and tufA-3b primers. The image is acquired with a prototype reader developed by Akonni. The arrays had the chip map shown in FIGS. 21A and 21B. The microarray systems contained a laser cut filter paper absorbent in the waste chamber (Whatman 31ET CHR Cellulose Chromatography Paper, 0.5 mm). The top side (hydrophobic side) of the hydrophilic cover film was cleaned with IPA after assembly. The Master Mix Preparation is as follows: 14 µl of master mix containing the mecA and tufA-3b primers and 1.0 µl of Methicillin-resistant *S. aureus* (MRSA) nucleic acid were prepared for each reaction (300 pg total DNA amplified in a 15 µl reaction volume) using the Qiagen Taq® DNA Polymerase kit (Qiagen, cat#201205) with 10% formamide added. 14 µl of the prepared reaction mix is added to the microarray system. The sample inlet port was covered with a foil tape pull-tab with an adhesive backing and the waste chamber vent was left open. All the slides were placed on the MJ Research PTC-200 DNA Engine thermocycler with attached slide tower and were amplified following the amplification parameters: 86.5° C. for 2 min, and 35 cycles of 86.5° C. for 45 sec, 50° C. for 1 min 30 sec, and final steps of 65° C. for 5 min, 85° C. for 2 min and 40° C. for 45 min. After amplification, the slides are removed from the slide tower and the foil tape covering the sample inlet port was then pierced and the array was washed with 35 µl of 1×SSPE in a single wash. The slide is then read without a drying step on the Akonni reader.

Example 11

Detection of Target DNA Under Different Hybridization Conditions

Biochip Assembly:

Biochip assemblies, shown in FIG. 7, consist of a microarray substrate, a spacer tape, a hydrophilic top film, a waste chamber with an absorbent, an inlet port, and a vent hole. The microarray substrates are either glass (Erie Scientific, Portsmouth, N.H.) or plastic. Plastic slides are molded to dimensions of 25.4 mm×76.2 mm×1 mm. Oligonucleotide probes are printed on blank slides with coordinates that position the array in the reaction chamber of the biochip once the spacer tape is applied. The printing method, similar to the methods described in Vasiliskov et al. (*Biotechniques* 1999) and Rubina et al. (*Biotechniques* 2003), consists of a co-polymerization and oligonucleotide probe mixture that is printed on the slide and UV cross-linked. Gel elements are 150 µm in diameter with a 300 µm center-to-center spacing. The biochips are constructed by laser cutting double-sided tape with cutouts for the inlet channel, reaction chamber, connecting channel, and waste chamber. A top film covers the array chamber and the waste chamber respectively. The top film is hydrophilic to allow capillary action to fill the entire reaction chamber. An absorbent (Whatman chromatography paper) resides in the waste chamber. The top film has a 1 mm hole for the inlet and a 1 mm hole for the vent, which is positioned at the distal edge of the waste chamber. Frame-Seals (BioRad, Hercules, Calif.) serve as control reaction chambers. The biochip assemblies and Frame-Seals are prepared at least one hour prior to use.

Sample Preparation and Hybridization:

MRSA DNA was prepared using Akonni's TruTip as described in Example 8. For hybridization in Biochips: A 15 µL reaction volume, which consists of 10 µL of hybridization master mix (containing 1.5 M guanidine thiocyanate, 75 mM HEPES, pH 7.5, 7.5 mM EDTA, 5 mg/mL BSA, and 3.7 fmol/uL hybridization control oligonucleotide) and 5 µL of amplified product, is prepared for addition to the biochip. The sample inlet port is covered with silicone tape that was laser cut into a 6.35 mm diameter circle and the waste chamber vent is left open. For hybridization in Frame-Seals: A 30 µL reaction, which consists of 20 µL of hybridization master mix and 10 µL of MRSA amplified product, is prepared for addition to the Frame-Seal. Of this 30 µL, 28 µl is added to the Frame-Seals and covered with parafilm. All the slides are placed on the MJ Research PTC-200 DNA Engine thermocycler with attached alpha unit slide tower and hybridized for three hours at 55° C. Both the biochip and the Frame-Seal master mix solutions are denatured in a tube for 5 minutes at 95° C. prior to the hybridization protocol, described below. This offline denaturation step is not part of the on-chip amplification protocol because the target can be denatured on-chip. On-chip PCR was performed as described in Example 8.

Washing:

Biochips:

After hybridization or on-chip amplification, the array is washed with volumes of 1×SSPE that range from 35 to 200 µL. The biochips are thoroughly dried to be compatible with an Aurora PortArray 5000. The materials are found to be compatible with acetone, which reduces the time of the heat drying step. Thus, in some cases the wash step is followed by pipetting 25 µL of water and then 15 µL or 75 µL of acetone into the biochip. To ensure the acetone is completely removed from the array chamber, the biochip is inverted for 3 minutes to allow residual acetone to drain into the waste chamber. The slides are then dried on a custom heat block, designed for a ThermoFisher 2001FSQ digital controlled heater, for 15 minutes at 50° C. This drying procedure is referred to as an "on-chip drying protocol" because the chip is not disassembled as opposed to the Frame-Seal protocol, which requires that the Frame-Seal gasket be removed prior to washing and drying by flowing air across the exposed array.

Frame-Seals:

The Frame-Seals are removed and the slides are washed for 3 minutes in a Telechem ArrayIt™ Brand High Throughput Wash Station containing 1×SSPE and 0.01% Triton X-100, rinsed with water, and dried with filtered, compressed air.

Detection and Analysis:

The arrays are read on either an Aurora PortArray 5000 reader, GenePix 4000B or Akonni's in-house reader, which uses an oblique angle laser-illumination technique and a CCD camera for detection. Unbinned output (12-bit, offset=0, gain=1) from either reader is saved in 16-bit, grayscale, tagged image file format conforming to the TIFF, Revision 6.0 standard. The .tif images are analyzed using the open-source application "Spotfinder" (Windows version 3.1.1, "Spotfinder3.1.1.exe") from The Institute for Genomic Research (Saeed et al., Biotechniques, 2003). Image segmentation is performed with the Otsu thresholding algorithm (Liao et al., Journal of Information Science and Engineering, 2001) within Spotfinder, and (median) background-corrected integral intensities for all spots are saved along with other derived statistics, related quality indices, and array location indicators, in a tab-delimited flat file (.mev) format. Subsequent data analysis is performed with Microsoft Office Excel 2003 Service Pack 3, where the average integral intensity of the replicate spots for each probe is compared to the average intensity of spots containing the $dN_{20}$ nonsense oligonucleotide (a model for biological noise due to nonspecific hybridization events).

Results

Figure 24:
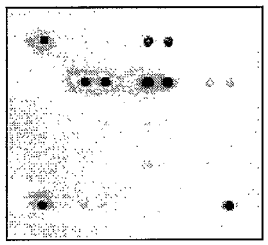
FIG. 24 is a composite of inverse images of arrays challenged with $10^4$ genomic copies of *S. pyogenes* under the following conditions: Panel (a) amplification in a tube, hybridization on the biochip, washing with a pipettor, and an on-chip drying procedure; Panel (b) PCR amplification on the biochip, washing with a pipettor, and an on-chip drying procedure; Panel (c) amplification in a tube, hybridization on the array in a Frame Seal, removal of the Frame Seal, washing in a bath and air drying. Panel (d) is an array map corresponding to images. Note the hybridization markers are only visible in images in panels (a) and (c) because the on-chip amp in panel (b) does not have hybridization markers in the master mix.
Figure 24:
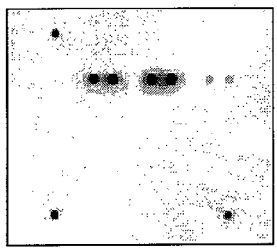
Figure 24:
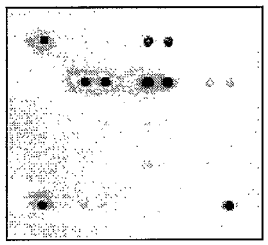
Figure 25:
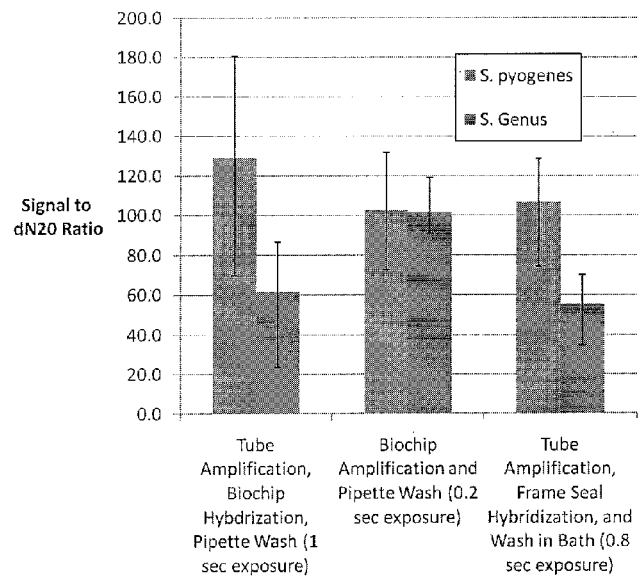
FIG. 25 is a diagram comparing the signal-to-noise ratio in each of the following conditions: 1) tube amplification and hybridization on the biochip followed by the pipetting wash and on-chip drying protocol, 2) biochip amplification followed by the pipetting wash protocol, and 3) tube amplification followed by Frame-Seal hybridization, washing in a bath and air drying. In each case $10^4$ genomic copies of *S. pyogenes* is amplified. The integral spot intensity minus the local background of two targets spots and dN20 nonsense spots are used to calculate the ratios shown. Using an Aurora Port Array 5000, the images are acquired for exposure times up to the duration when the spots are just below saturation.
Figure 26:
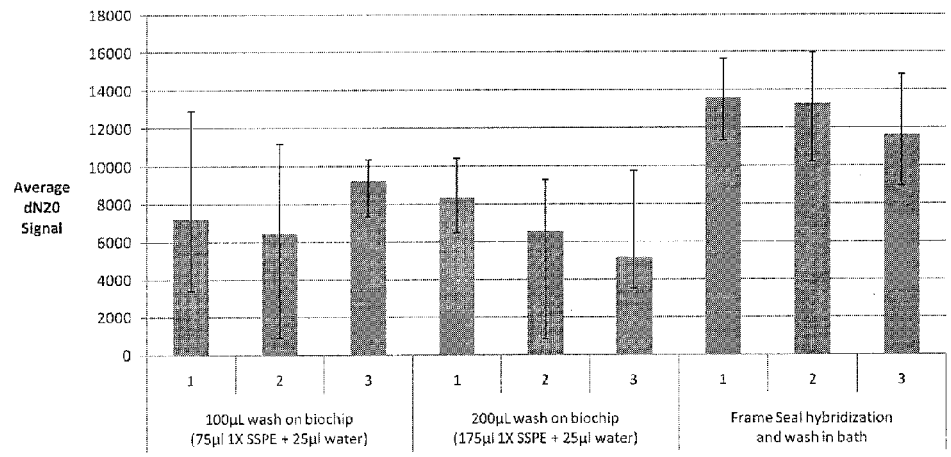
FIG. 26 is a diagram comparing the average noise (dN20) signal in each of the following conditions: 1) biochip amplification followed by pipettor washing with 75 μL 1×SSPE and 25 μL of water; 2) biochip amplification followed by pipettor washing with 175 μL 1×SSPE and 25 μL of water; and 3) amplification in a tube, hybridizing in Frame-Seals and washing arrays in a microarray bath. The input sample is $10^4$ genomic copies of *S. pyogenes* for both the biochips and the Frame Seals. The biochips are imaged with an Aurora Port Array 5000 for 0.2 seconds. The $dN_{20}$ (nonsense probe) spots are identified with Spotfinder, and the integral fluorescent intensity of each of 4 $dN_{20}$ spots minus the local background is averaged and plotted along with error bars, which represent the minimum and maximum values. The $dN_{20}$ signals are inversely proportional to the effectiveness of washing because the $dN_{20}$ nonsense probes fluoresce due to non-specific binding with labeled target such as the product from the amplification reaction.

FIGS. 24-26 compare the results of experiments in which the gel-element oligo arrays are exposed to three separate conditions, loosely classified as: hybridization in the biochip, solution phase amplification followed by hybridization in the biochip, and hybridization in a Frame-Seal format. On-chip PCR in the Frame-Seal format is not presented because the protocol requires removing the gasket following amplification, which introduces the risk of contamination, and thus, does not provide a compelling utility. The protocols are performed as described in the experimental section with wash buffer volumes of 175 µL of 1×SSPE, 25 µL of water, and 15 µL of acetone for both the on-chip amplification and the biochip hybridization. The amplification master mix does not contain hybridization markers, and thus the hybridization spots in FIG. 24, panel B, do not fluoresce.

FIG. 25 shows the signal-to-nonsense ratio of *S. pyogenes* and *S. genus* in replicates of 3 for each condition with error bars that represent minimum and maximum values. The starting genomic copy number for each condition is approximately $10^4$. This data suggests that the on-chip amplification for the biochip gives comparable performance to amplification in a tube followed by transfer to the biochip, as does amplification in a tube and transfer to a Frame-Seal. The error bars are large in this study because of the approach of dividing by the nonsense probes, which have a low signal because of the effectiveness of the washing procedure. Note, the washing procedure should lower the signal intensity of the nonsense probes because the washing is effectively removing labeled primer or product from the nonsense probes. Thus, small changes in the nonsense signal (denominator) result in large changes in the ratio. An additional study, shown in FIG. 26, comparing the nonsense signals for three different wash conditions further illustrates this variability in intensity. Despite the variability for all three conditions, the limited data set does suggest that the small volume pipette washing protocol on the biochip is as good or better than washing in a bath. This data also suggests that the wash protocol can be as low as 100 µL without loss in signal-to-nonsense ratios. In fact, additional studies suggest that the volume can be as low as 35 µL. These low volumes allow the wash steps to be performed in a lab-on-a-chip format while containing all of the reagents on the chip, and thus reducing, if not eliminating, the contamination risk.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A device for detecting a target molecule, comprising:
a reaction chamber comprising
an inlet;
an outlet;
a target capturing surface that binds specifically to the target molecule,
a bottom surface of the reaction chamber, wherein the bottom surface comprises the target capturing surface, wherein the target capturing surface comprises a microarray; and
a top surface of the reaction chamber, wherein the top surface is a hydrophilic surface;
side walls of the reaction chamber, wherein the side walls are hydrophobic,
a waste chamber having an absorbent to allow liquids to be advanced by capillary action through the reaction chamber for washing; and
a channel of variable width connecting the reaction chamber to the waste chamber, wherein the channel comprises two sections, a first section at the end proximate to the reaction chamber and a second section at the end proximate to the waste chamber, wherein the first section has a diameter or cross-section area that is larger than the diameter or cross-section area of the second section,
wherein the second section further comprises two subsections: a first subsection next to the first section and a second subsection next to the waste chamber, wherein the first subsection forms an angle with the second subsection and has a diameter that is larger than the diameter of the second subsection.

2. The device of claim 1, wherein the waste chamber comprises a vent.

3. The device of claim 1, wherein the inlet port comprises a pierceable membrane or tape or a dome valve to allow washing to occur without allowing the content inside the reaction chamber to be liberated from the microarray system.

* * * * *